(12) United States Patent
Casey et al.

(10) Patent No.: US 11,084,172 B2
(45) Date of Patent: Aug. 10, 2021

(54) OBSTACLE FOLLOWING SENSOR SCHEME FOR A MOBILE ROBOT

(71) Applicant: iRobot Corporation, Bedford, MA (US)

(72) Inventors: Christopher M. Casey, Lexington, MA (US); Matthew Cross, Mason, NH (US); Daniel N. Ozick, Newton, MA (US); Joseph L. Jones, Acton, MA (US)

(73) Assignee: iRobot Corporation, Bedford, MA (US)

( * ) Notice: Subject to any disclaimer, the term of this patent is extended or adjusted under 35 U.S.C. 154(b) by 489 days.

(21) Appl. No.: 15/240,595

(22) Filed: Aug. 18, 2016

(65) Prior Publication Data

US 2017/0066132 A1    Mar. 9, 2017

Related U.S. Application Data

(63) Continuation of application No. 14/297,892, filed on Jun. 6, 2014, now Pat. No. 9,446,521, which is a (Continued)

(51) Int. Cl.
*B25J 9/16* (2006.01)
*G05D 1/02* (2020.01)
(Continued)

(52) U.S. Cl.
CPC ............ *B25J 9/1697* (2013.01); *G05D 1/024* (2013.01); *G05D 1/0238* (2013.01);
(Continued)

(58) Field of Classification Search
CPC .... G05D 1/024; G05D 1/0242; G05D 1/0255; G05D 2201/0203; G05D 2201/0208;
(Continued)

(56) References Cited

U.S. PATENT DOCUMENTS

| 4,638,445 A | 1/1987 | Mattaboni |
| 4,821,192 A * | 4/1989 | Taivalkoski ........... B25J 9/0003 |
| | | 700/258 |

(Continued)

FOREIGN PATENT DOCUMENTS

| DE | 19849978 | 2/2001 |
| JP | 11212642 | 8/1999 |

OTHER PUBLICATIONS https://web.archive.org/web/20030518174835/https://www.cs.hmc.edu/~dodds/projects/RobS01/Assignment2/Fixed_HTML/wfcode.html (Year: 2003).*

(Continued)

*Primary Examiner* — Nicholas Kiswanto
(74) *Attorney, Agent, or Firm* — Fish & Richardson P.C.

(57) ABSTRACT

A robot obstacle detection system including a robot housing which navigates with respect to a surface and a sensor subsystem aimed at the surface for detecting the surface. The sensor subsystem includes an emitter which emits a signal having a field of emission and a photon detector having a field of view which intersects the field of emission at a region. The subsystem detects the presence of an object proximate the mobile robot and determines a value of a signal corresponding to the object. It compares the value to a predetermined value, moves the mobile robot in response to the comparison, and updates the predetermined value upon the occurrence of an event.

20 Claims, 28 Drawing Sheets

Related U.S. Application Data continuation of application No. 12/145,184, filed on Jun. 24, 2008, now Pat. No. 8,761,935, which is a continuation of application No. 12/126,757, filed on May 23, 2008, now Pat. No. 8,478,442, which is a continuation of application No. 11/834,553, filed on Aug. 6, 2007, now Pat. No. 7,430,455, said application No. 12/145,184 is a continuation of application No. 11/834,573, filed on Aug. 6, 2007, now Pat. No. 8,788,092, which is a continuation-in-part of application No. 11/166,986, filed on Jun. 24, 2005, now Pat. No. 8,412,377, and a continuation of application No. 10/453,202, filed on Jun. 3, 2003, now Pat. No. 7,155,308, and a continuation of application No. 09/768,773, filed on Jan. 24, 2001, now Pat. No. 6,594,844.

(60) Provisional application No. 60/582,992, filed on Jun. 25, 2004, provisional application No. 60/177,703, filed on Jan. 24, 2000.

(51) Int. Cl.
 *G01S 15/931* (2020.01)
 *G01S 17/93* (2020.01)

(52) U.S. Cl.
 CPC ......... *G05D 1/0242* (2013.01); *G05D 1/0255* (2013.01); *A47L 2201/04* (2013.01); *G01S 15/931* (2013.01); *G01S 17/93* (2013.01); *G05D 2201/0203* (2013.01); *G05D 2201/0208* (2013.01); *G05D 2201/0215* (2013.01); *Y02P 90/02* (2015.11); *Y10S 901/01* (2013.01); *Y10S 901/47* (2013.01)

(58) Field of Classification Search
 CPC ........... G05D 2201/0215; Y02P 90/265; A47L 2201/04; G01S 15/931; G01S 17/93; Y10S 901/01; Y10S 901/47; B25J 9/1697
 See application file for complete search history.

(56) References Cited

U.S. PATENT DOCUMENTS

| | | | | |
|---|---|---|---|---|
| 5,109,566 A * | 5/1992 | Kobayashi | .......... | A47L 11/4011 15/319 |
| 5,165,064 A | 11/1992 | Mattaboni | | |
| 5,279,672 A * | 1/1994 | Betker | .................. | A47L 11/305 134/18 |
| 5,293,659 A * | 3/1994 | Rief | ...................... | E04H 4/1663 15/1.7 |
| 5,341,540 A * | 8/1994 | Soupert | ............... | A47L 11/4011 15/319 |
| 5,444,965 A | 8/1995 | Colens | | |
| 5,787,545 A | 8/1998 | Colens | | |
| 5,839,156 A | 11/1998 | Park et al. | | |
| 5,869,910 A | 2/1999 | Colens | | |
| 5,947,225 A * | 9/1999 | Kawakami | .......... | G05D 1/0219 180/167 |
| 6,076,025 A | 6/2000 | Ueno et al. | | |
| 6,185,781 B1 * | 2/2001 | Miller | .................. | B24D 13/147 15/28 |
| 6,189,180 B1 * | 2/2001 | Hato | ..................... | A47L 9/0411 15/380 |
| 6,389,329 B1 * | 5/2002 | Colens | ..................... | A47L 5/30 700/262 |
| 6,493,612 B1 * | 12/2002 | Bisset | ...................... | A47L 5/28 15/319 |
| 6,594,844 B2 * | 7/2003 | Jones | ................... | G05D 1/0238 15/319 |
| 6,809,490 B2 * | 10/2004 | Jones | ................... | G05D 1/0219 318/568.12 |
| 7,146,682 B2 * | 12/2006 | Damman | ................. | A47L 5/30 15/388 |
| 7,167,775 B2 * | 1/2007 | Abramson | ................ | A47L 5/22 180/167 |
| 9,446,521 B2 * | 9/2016 | Casey | .................. | G05D 1/0238 |
| 2007/0042716 A1 * | 2/2007 | Goodall | ............... | G05D 1/0274 455/67.11 |

OTHER PUBLICATIONS https://web.archive.org/web/20030517150817/https://www.cs.hmc.edu/~dodds/projects/RobS01/Assignment2/Fixed_HTML/follow.html (Year: 2003).*

Canudas de Wit, Carlos; Siciliano, Bruno; Bastin, Georges. *Theory of Robot Control*. Sprinqer-Verlag London Limited 1996. p. 68-71. [http://www.gipsa-lab.grenoble-inp.fr/~carlos.canudas-de-wit/publications/Theory_of_robot_control.pdf].*

Jung, David; Zelinsky, Alexander. "Whisker Based Mobile Robot Navigation". 1996. IEEE Xplore. [https://ieeexplore.ieee.org/iel3/4292/12372/00570842.pdf].*

Denning Roboscrub image (1989), 1 page.

Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.

Electrolux, "Designed for the well-lived home," Retrieved from the Internet: URL<http://www.electroluxusa.com/node57.as[?currentURL=nodel42.asp%3F >. Accessed Mar. 2005, 2 pages.

Facts on Trilobite, webpage, Retrieved from the Internet: URL< http://trilobiteelectroluxse/presskit_en/model11335asp?print=yes&pressID=>. 2 pages, accessed Dec. 2003.

Gregg et al., "Autonomous Lawn Care Applications," 2006 Florida Conference on Recent Advances in Robotics, Miami, Florida, May 25-26, 2006, Florida International University, 5 pages.

Hitachi: News release: "The home cleaning robot of the autonomous movement type (experimental machine)," Retrieved from the Internet: URL<www.i4u.com./japanreleases/hitachirobot.htm>. 5 pages, Mar. 2005.

Karcher "Karcher RoboCleaner RC 3000," Retrieved from the Internet: URL<www.robocleaner.de/english/screen3.html>. 4 pages, Dec. 2003.

Karcher USA, RC3000 Robotic Cleaner, website: http://www.karcher-usa.com/showproducts.php?pp=viewprod&paraml=143&param2=&param3=, 3 pages accessed Mar. 2005.

Karcher, "Product Manual Download Karch", available at www.karcher.com, 16 pages, 2004.

King and Weiman, "HelpmateTM Autonomous Mobile Robots Navigation Systems," SPIE vol. 1388 Mobile Robots, pp. 190-198, 1990.

Maschinemarkt Würzburg 105, No. 27, pp. 3, 30, Jul. 5, 1999 (with English translation).

\* cited by examiner

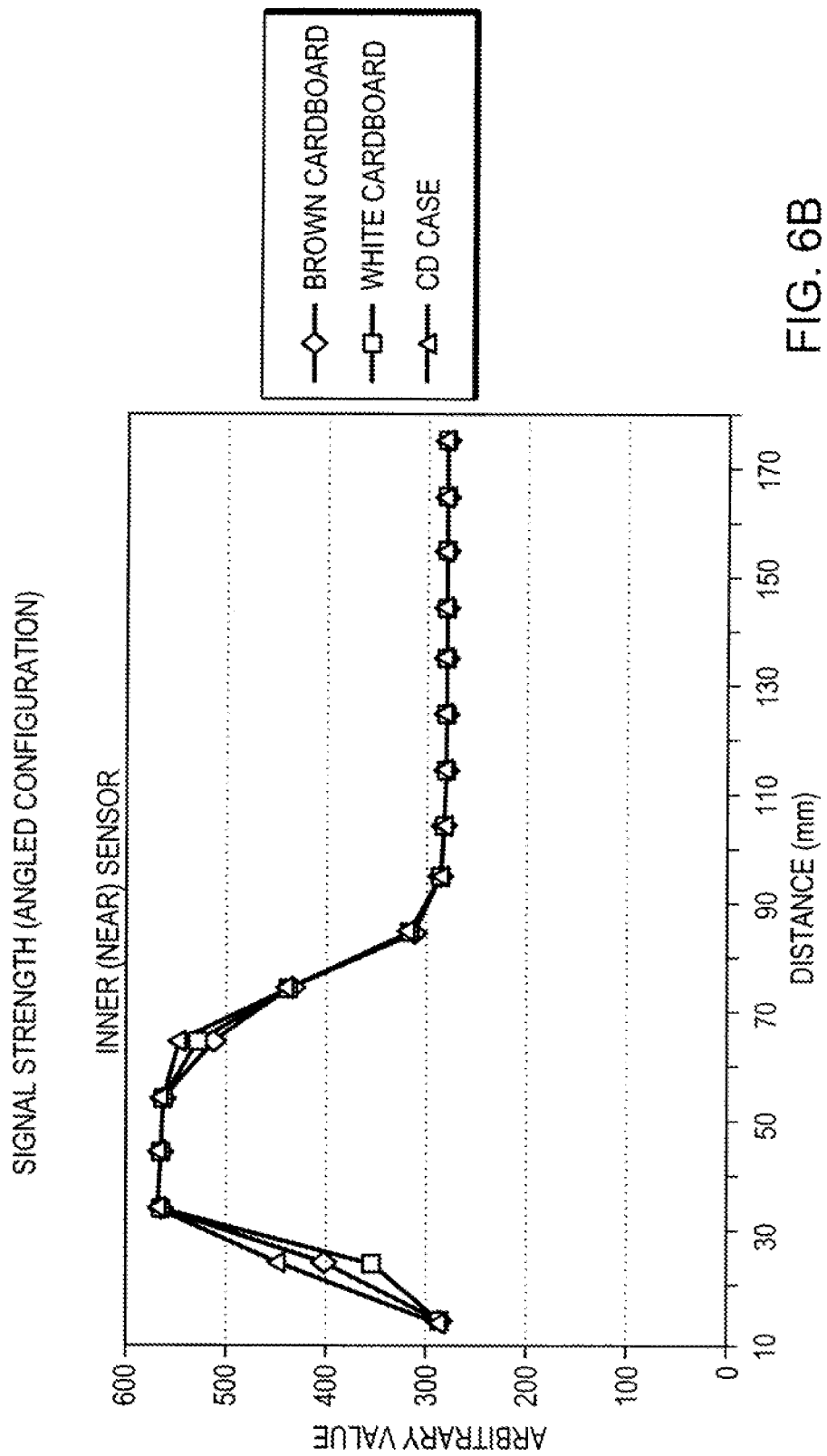

OBSTACLE FOLLOWING SENSOR SCHEME FOR A MOBILE ROBOT

CROSS-REFERENCE TO RELATED APPLICATIONS

This application claims priority to and is a continuation of U.S. patent application Ser. No. 14/297,892, filed Jun. 6, 2014, which is a continuation of U.S. patent application Ser. No. 12/145,184, filed Jun. 24, 2008, which is a continuation of U.S. patent application Ser. No. 12/126,757, filed May 23, 2008, now U.S. Pat. No. 8,478,442, which is a continuation of U.S. patent application Ser. No. 11/834,553, filed Aug. 6, 2007, now U.S. Pat. No. 7,430,455, which is a continuation of U.S. patent application Ser. No. 11/834,573, filed Aug. 6, 2007 which is a continuation-in-part of Ser. No. 11/166,986, filed Jun. 24, 2005, now U.S. Pat. No. 8,412,377, which is a continuation-in-part application of U.S. patent application Ser. No. 10/453,202, filed Jun. 3, 2003, which is a continuation-in-part of U.S. patent application Ser. No. 09/768,773, filed Jan. 24, 2001, now U.S. Pat. No. 6,594,844, which claims priority to U.S. Provisional Patent Application Ser. No. 60/177,703, filed Jan. 24, 2000, the disclosures of which are herein incorporated by reference in their entireties. This application also claims priority to U.S. Provisional Patent Application Ser. No. 60/582,992, filed Jun. 25, 2004, the disclosure of which is herein incorporated by reference in its entirety.

FIELD OF THE INVENTION

This invention relates to an obstacle detection system for an autonomous robot, such as an autonomous cleaning robot.

BACKGROUND OF THE INVENTION

There is a long felt need for autonomous robotic cleaning and processing devices for dusting, mopping, vacuuming, sweeping, lawn mowing, ice resurfacing, ice melting, and other operations. Although technology exists for complex robots which can, to some extent, "see" and "feel" their surroundings, the complexity, expense and power requirements associated with these types of robotic subsystems render them unsuitable for the consumer marketplace.

The assignee of the subject application has devised a less expensive, battery operated, autonomous cleaning robot which operates in various modes, including random bounce and wall-following modes. In the random bounce mode, the processing circuitry of the robot causes it to move in a straight line until the robot comes into contact with an obstacle; the robot then turns away from the obstacle and heads in a random direction. In the wall-following mode, the robot encounters a wall, follows it for a time, and then returns to the random mode. By using this combination of modes, robotic theory has proven that the floor, including the edges thereof, is adequately covered in an optimal time resulting in a power savings.

Unfortunately, however, presently available sensor subsystems such as sonar sensors for detecting obstacles on or in the floor or for detecting the wall in order to enter the wall-following mode (or to avoid bumping into the wall) are either too complex or too expensive or both. Tactile sensors are inefficient to ensure that walls or other obstacles can be effectively followed at a predetermined distance.

Some existing systems that disclose wall-following modes for autonomous robots are disclosed in International Publication No. WO 02/101477 A2, U.S. patent application Ser. No. 10/453,202 and U.S. Pat. No. 6,809,490, the disclosures of which are herein incorporated by reference in their entireties. In an embodiment of the system disclosed in the U.S. patent and application (and available commercially from iRobot Corporation as the ROOMBA® Robotic Floorvac), analog electronics (i.e., a comparator) are used to determine whether a sensor has detected the wall or not. The system is designed to follow along a wall at a predetermined distance to allow a cleaning mechanism (e.g., a side brush) to clean against a wall. In the ROOMBA® Robotic Floorvac, a mechanical shutter proximate the sensor can be manually adjusted by the user in order to make the robot follow an appropriate distance from the wall. This shutter is used since the sensor can be sensitive to the albedo of the wall. This manually adjusted shutter, while effective, detracts from the autonomous nature of mobile robots; thus, a fully independent wall-following scheme for a mobile robot is needed.

SUMMARY OF THE INVENTION

Accordingly, the control system of the present invention utilizes, in one embodiment, a synchronous detection scheme inputted directly into an A/D port on a microprocessor of the robot. This allows sensor values, and not merely the presence or absence of a wall, to be used to control the robot. The synchronous detection algorithm also allows readings to be taken with and without the sensor emitter powered, which allows the system to take into account ambient light.

In one aspect, the invention relates to a robot obstacle detection system that is simple in design, low cost, accurate, easy to implement, and easy to calibrate.

In an embodiment of the above aspect, such a robot detection system prevents an autonomous cleaning robot from driving off a stair or an obstacle that is too high.

In another aspect, the invention relates to a robotic wall detection system that is low cost, accurate, easy to implement, and easy to calibrate.

In an embodiment of the above aspect, such a robot wall detection system effects smoother robot operation in the wall-following mode.

In yet another aspect, the invention relates to a sensor subsystem for a robot that consumes a minimal amount of power.

In still another aspect, the invention relates to a sensor subsystem that is unaffected by surfaces of different reflectivity or albedo.

Another aspect of the invention results from the realization that a low cost, accurate, and easy-to-implement system for either preventing an autonomous robot from driving off a stair or over an obstacle which is too high or too low and/or for more smoothly causing the robot to follow a wall for more thorough cleaning can be effected by intersecting the field of view of a detector with the field of emission of a directed beam at a predetermined region and then detecting whether the floor or wall occupies that region. If the floor does not occupy the predefined region, a stair or some other obstacle is present and the robot is directed away accordingly. If a wall occupies the region, the robot is first turned away from the wall and then turned back towards the wall at decreasing radiuses of curvature until the wall once again occupies the region of intersection to effect smoother robot operation in the wall-following mode.

One embodiment of the invention features an autonomous robot having a housing that navigates in at least one direction on a surface. A first sensor subsystem is aimed at the surface for detecting obstacles on the surface. A second sensor subsystem is aimed at least proximate the direction of navigation for detecting walls. Each subsystem can include an optical emitter which emits a directed beam having a defined field of emission and a photon detector having a defined field of view which intersects the field of emission of the emitter at a finite, predetermined region.

Another embodiment of the robot obstacle detection system of this invention features a robot housing which navigates with respect to a surface and a sensor subsystem having a defined relationship with respect to the housing and aimed at the surface for detecting the surface. The sensor subsystem can include an optical emitter which emits a directed beam having a defined field of emission and a photon detector having a defined field of view which intersects the field of emission of the emitter at a region. A circuit in communication with the detector then redirects the robot when the surface does not occupy the region to avoid obstacles.

In certain embodiments, there are a plurality of sensor subsystems spaced from each other on the housing of the robot and the circuit includes logic for detecting whether any detector has failed to detect a beam from an emitter.

In one embodiment, the robot includes a surface cleaning brush. Other embodiments attach to the robot a buffing brush for floor polishing, a wire brush for stripping paint from a floor, a sandpaper drum for sanding a surface, a blade for mowing grass, etc. The emitter typically includes an infrared light source and, consequently, the detector includes an infrared photon detector. A modulator connected to the infrared light source modulates the directed infrared light source beam at a predetermined frequency, with the photon detector tuned to that frequency. The emitter usually includes an emitter collimator about the infrared light source for directing the beam and the detector then further includes a detector collimator about the infrared photon detector. The emitter collimator and the detector collimator may be angled with respect to the surface to define a finite region of intersection.

One embodiment of the robot wall detection system in accordance with the invention includes a robot housing which navigates with respect to a wall and a sensor subsystem having a defined relationship with respect to the housing and aimed at the wall for detecting the presence of the wall. The sensor subsystem includes an emitter which emits a directed beam having a defined field of emission and a detector having a defined field of view which intersects the field of emission of the emitter at a region. A circuit in communication with the detector redirects the robot when the wall occupies the region.

In another embodiment, there are a plurality of sensor subsystems spaced from each other on the housing of the robot and the circuit includes logic for detecting whether any detector has detected a beam from an emitter.

The circuit includes logic which redirects the robot away from the wall when the wall occupies the region and back towards the wall when the wall no longer occupies the region of intersection, typically at decreasing radiuses of curvature until the wall once again occupies the region of intersection to effect smooth operation of the robot in the wall-following mode.

The sensor subsystem for an autonomous robot which rides on a surface in accordance with this invention includes an optical emitter which emits a directed optical beam having a defined field of emission, a photon detector having a defined field of view which intersects the field of emission of the emitter at a region and a circuit in communication with a detector for providing an output when an object is not present in the region.

If the object is the surface, the output from the circuit causes the robot to be directed to avoid an obstacle. If, on the other hand, the object is a wall, the output from the circuit causes the robot to be directed back towards the wall.

If the object is diffuse, at least one of the detector and the emitter may be oriented normal to the object. Also, an optional lens for the emitter and a lens for the detector control the size and/or shape of the region. A control system may be included and configured to operate the robot in a plurality of modes including an obstacle following mode, whereby said robot travels adjacent to an obstacle. Typically, the obstacle following mode comprises alternating between decreasing the turning radius of the robot as a function of distance traveled, such that the robot turns toward said obstacle until the obstacle is detected, and such that the robot turns away from said obstacle until the obstacle is no longer detected. In one embodiment, the robot operates in obstacle following mode for a distance greater than twice the work width of the robot and less than approximately ten times the work width of the robot. In one example, the robot operates in obstacle following mode for a distance greater than twice the work width of the robot and less than five times the work width of the robot.

In another aspect, the invention relates to a method for operating a mobile robot, the method including the steps of detecting the presence of an object proximate the mobile robot, sensing a value of a signal corresponding to the object, comparing the value to a predetermined value, moving the mobile robot in response to the comparison, and updating the predetermined value upon the occurrence of an event. In another embodiment, the updated predetermined value is based at least in part on a product of the predetermined value and a constant. In certain embodiments, the event may include a physical contact between the mobile robot and the object or may include when a scaled value is less than the predetermined value. In one embodiment, the scaled value is based at least in part on a product of the value and a constant. The step of moving the mobile robot may include causing the robot to travel toward the object, when the value is less than the predetermined value, and/or causing the robot to travel away from the object, when the value is greater than the predetermined value.

In other embodiments, the method includes conditioning the value of the signal corresponding to the object. The detection step of the method may also include a first detection at a first distance to the object, and a second detection at a second distance to the object. The detection step may include emitting at least one signal and/or measuring at least one signal with at least one sensor. Embodiments of the above aspect may average a plurality of signals or filter one or more signals. In certain embodiments, a plurality of sensors are disposed on the mobile robot in a predetermined pattern that minimizes a variation in object reflectivity. Other embodiments vary the power of at least one emitted signal and/or vary the sensitivity of at least one sensor.

In various embodiments of the above aspect, at least one emitted signal or detected signal includes light having at least one of a visible wavelength and an infrared wavelength. In other embodiments of the above aspect, at least one emitted signal or detected signal includes an acoustic wave having at least one of an audible frequency and an ultrasonic frequency. Other embodiments of the above aspect include a mobile robot, the robot having at least one infrared emitter and at least one infrared detector, wherein the infrared emitter and the infrared detector are oriented substantially parallel to each other. In certain embodiments, the signal value corresponds to at least one of a distance to the object and an albedo of the object.

In another aspect, the invention relates to a method for operating a mobile robot, the method including the steps of detecting a presence of an object proximate the mobile robot, detecting an absence of the object, moving the robot a predetermined distance in a predetermined first direction, and rotating the robot in a predetermined second direction about a fixed point. In certain embodiments of the above aspect, the predetermined distance corresponds at least in part to a distance from a sensor located on the robot to a robot wheel axis. In one embodiment, the first direction is defined at least in part by a previous direction of motion of the robot prior to detecting the absence of the object.

In alternative embodiments, the fixed point is a point between a first wheel of the robot and the object. In some embodiments, the first wheel is proximate the object. In other embodiments, rotating the robot may cease on the occurrence of an event, the event including detecting a presence of an object, contacting an object, or rotating the robot beyond a predetermined angle. An additional step of moving in a third direction is included in other embodiments.

BRIEF DESCRIPTION OF THE DRAWINGS

Other objects, features and advantages will occur to those skilled in the art from the following description of some embodiments of the invention and the accompanying drawings, in which:

FIG. 6B is a graph of signal strength versus distance for the sensor-detector configuration depicted in FIG. 6A;

DETAILED DESCRIPTION

Figure 1:
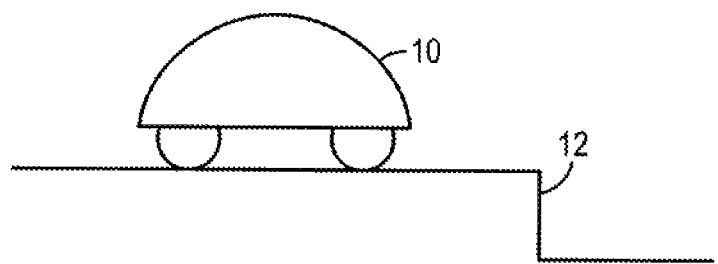
FIG. 1 is schematic view of a robot in accordance with one embodiment of the invention approaching a downward stair.
Figure 2:
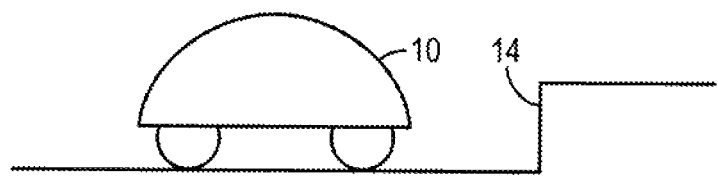
FIG. 2 is a schematic view of the robot of FIG. 1 approaching an upward stair.
Figure 3:
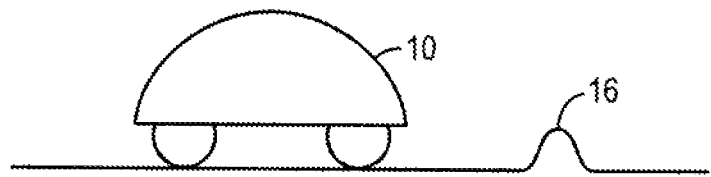
FIG. 3 is a schematic view of the robot of FIG. 1 approaching an obstacle on a floor.

Robotic cleaning device 10, FIG. 1 can be configured to dust, mop, vacuum, and/or sweep a surface such as a floor. Typically, robot 10 operates in several modes: random coverage, spiral, and a wall-following mode, as discussed in U.S. Pat. No. 6,809,490 and in the Background section above. In any mode, robot 10 may encounter downward stair 12 or another similar "cliff," upward stair 14, FIG. 2, or another similar rise, and/or obstacle 16, FIG. 3. According to one specification, the robot must be capable of traversing obstacles less then ⅝" above or below floor level. Therefore, robot 10 must avoid stairs 12 and 14 but traverse obstacle 16 which may be an extension cord, the interface between a rug and hard flooring, or a threshold between rooms.

Figure 4:
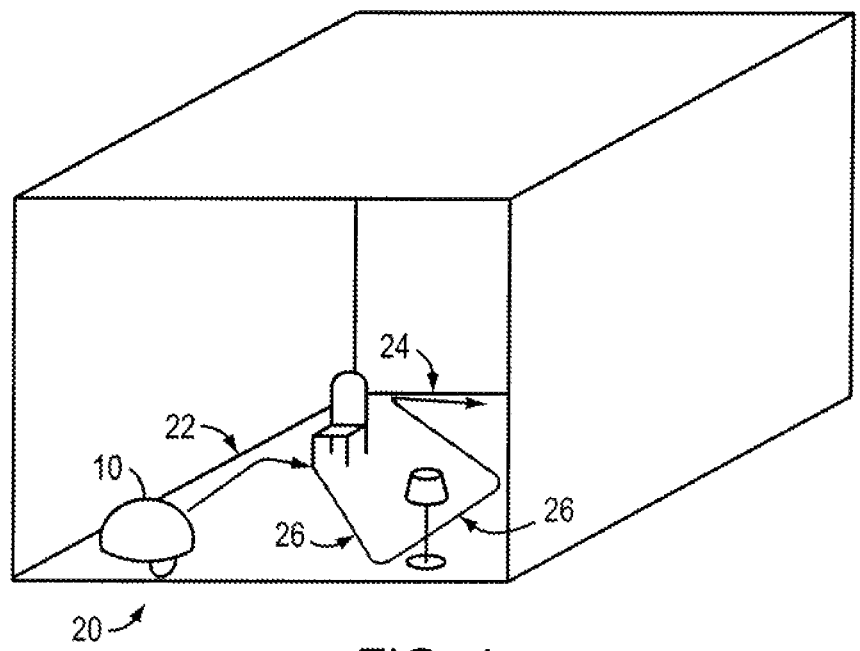
FIG. 4 is a schematic view showing the difference between the wall-following and random modes of travel of a robot in accordance with one embodiment of the invention.

As delineated in the background of the invention, presently available obstacle sensor subsystems useful in connection with robot 10 are either too complex or too expensive or both. Moreover, robot 10, depicted in FIG. 4, is designed to be inexpensive and to operate based on battery power to thus thoroughly clean room 20 in several modes: a spiral mode (not shown), a wall-following mode as shown at 22 and 24, and a random bounce mode as shown at 26. In the wall-following mode, the robot follows the wall for a time. In the random bounce mode, the robot travels in a straight line until it bumps into an object. It then turns away from the obstacle by a random turn and then continues along in a straight line until the next object is encountered.

Accordingly, any obstacle sensor subsystem must be inexpensive, simple in design, reliable, must not consume too much power, and must avoid certain obstacles but properly recognize and traverse obstacles which do not pose a threat to the operation of the robot.

Although the following disclosure relates to cleaning robots, the invention hereof is not limited to such devices and may be useful in other devices or systems wherein one or more of the design criteria listed above are important.

Figure 5A:
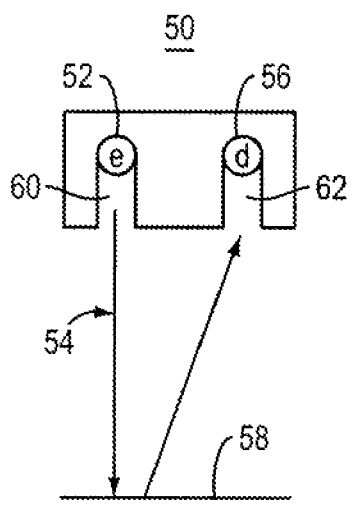
FIG. 5A is a schematic view of a sensor subsystem in accordance with one embodiment of the invention.

In one embodiment, depicted in FIG. 5A, sensor subsystem 50, includes optical emitter 52 which emits a directed beam 54 having a defined field of emission explained supra. Sensor subsystem 50 also includes photon detector 56 having a defined field of view which intersects the field of emission of emitter 52 at or for a given region. Surface 58 may be a floor or a wall depending on the arrangement of sensor subsystem 50 with respect to the housing of the robot.

In general, for obstacle avoidance, circuitry is added to the robot and connected to detector 56 to redirect the robot when surface 58 does not occupy the region defining the intersection of the field of emission of emitter 52 and the field of view of detector 56. For wall-following, the circuitry redirects the robot when the wall occupies the region defined by the intersection of the field of emission of emitter 52 and the field of view of detector 56. Emitter collimator tube 60 forms directed beam 54 with a predefined field of emission and detector collimator tube 62 defines the field of view of the detector 56. In alternative embodiments, collimator tubes 60, 62 are not used.

FIG. 5A depicts one embodiment of the invention where the emitter 52 and detector 56 are parallel to each other and perpendicular to a surface. This orientation makes the signal strength at the detector more dependant on the distance to obstacle. However, in this orientation, the difference between a white or highly reflective surface a long distance away from subsystem 50 and a black or non-reflective surface closer to subsystem 50 cannot be easily detected by the control circuitry. Moreover, the effects of specular scattering are not always easily compensated for adequately when the beam from emitter 52 is directed normal to the plane of surface 58. Notwithstanding the foregoing, this parallel configuration of emitter 52 and detector 56 can be utilized advantageously with the wall-following mode depicted in FIGS. 21A and 21B, described in more detail below.

Figure 6A:
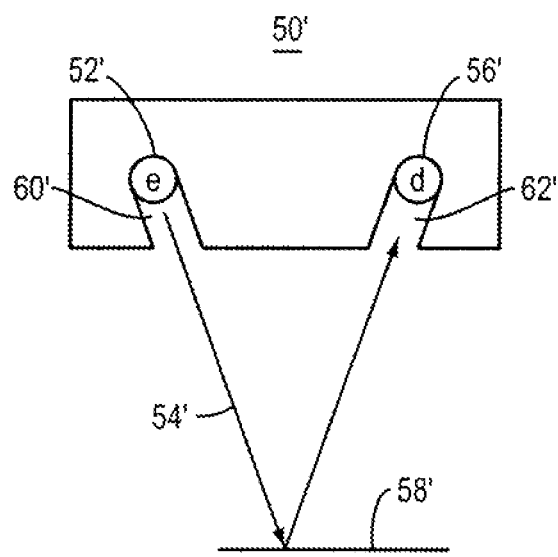
FIG. 6A is a schematic view of a sensor subsystem in accordance with another embodiment of the invention.
Figure 7:
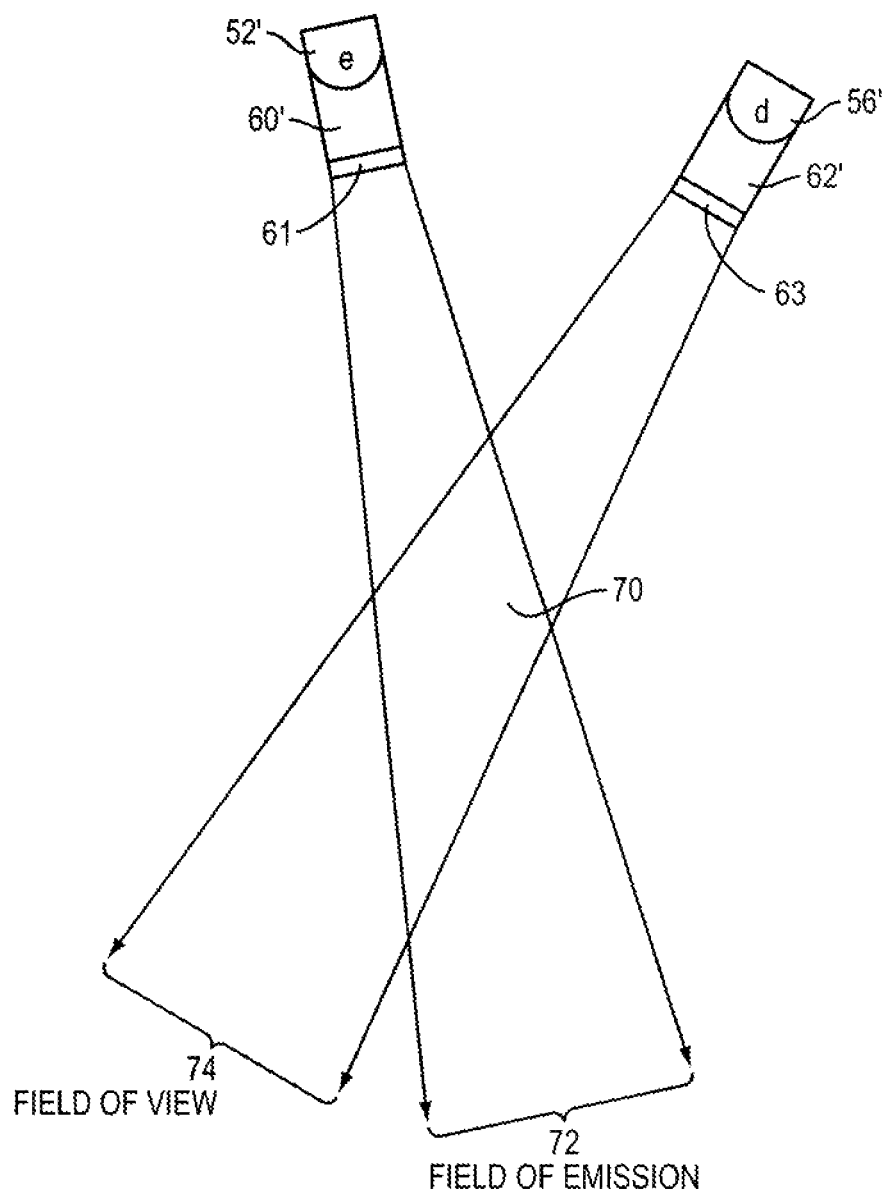
FIG. 7 is a schematic view showing the field of emission of the emitter and the field of view of the detector of the sensor subsystem in accordance with one embodiment of the invention.

In another embodiment, depicted in FIG. 6A, emitter collimator 60' and detector collimator 62' are both angled with respect to surface 58 and with respect to each other as shown, which is intended to reduce the signal strength dependence on the wall reflectivity. In this way, the region 70, FIG. 7, in which the field of emission of emitter 52' as shown at 72 and the field of view of detector of 56' as shown at 74 intersect is finite to more adequately address specular scattering and surfaces of different reflectivity. In this design, the emitter is typically an infrared emitter and the detector is typically an infrared radiation detector. The infrared energy directed at the floor decreases rapidly as the sensor-to-floor distance increases while the infrared energy received by the detector changes linearly with surface reflectivity. Note, however, that an angled relationship between the emitter and detector is not required for diffuse surfaces. Optional lenses 61 and 63 may also be employed to better control the size and/or shape of region 70.

Figure 5B:
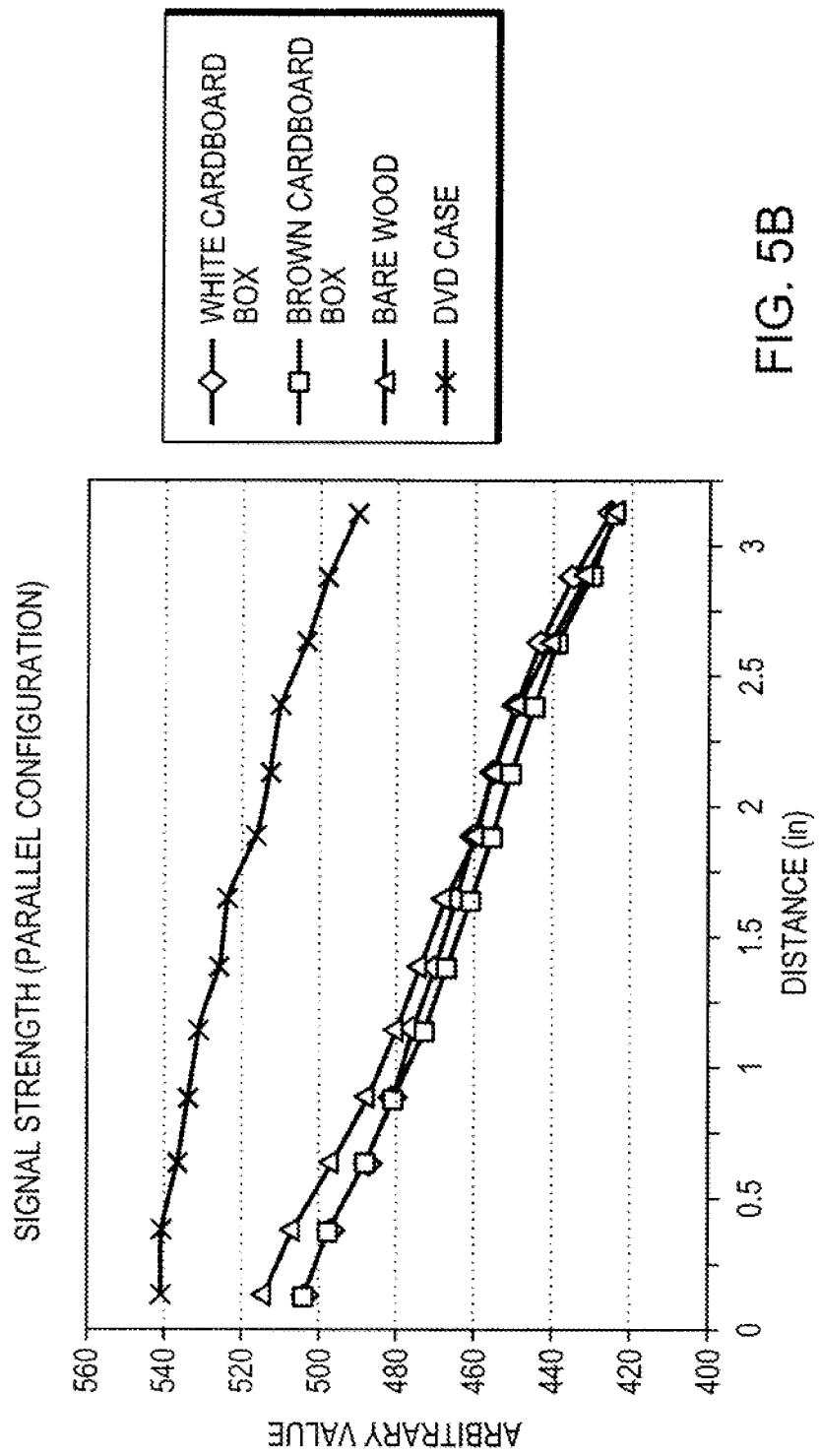
FIG. 5B is a graph of signal strength versus distance for the sensor-detector configuration depicted in FIG. 5A.

FIGS. 5B and 6B are graphs comparing the signal strength to distance from an object for the emitter/detector configurations depicted in FIGS. 5A and 6B, respectively. In FIG. 5B, depicting the relationship for a parallel configuration, the signal strength is proportional to the distance, and approaches a linear relationship for all four surfaces tested (white cardboard, brown cardboard, bare wood, and clear plastic). Accordingly, sensors arranged to detect walls or other essentially vertical obstacles are well-suited to the parallel configuration, as it allows surfaces further distance away to be effectively detected.

FIG. 6B, on the other hand, depicts the relationship for an angled configuration of the emitter/detector. In this orientation, the signal strength falls off rapidly at a closer distance, regardless of surface type, for all three surfaces tested (brown cardboard, white cardboard, and clear plastic). This occurs when the surface being detected is no longer present in the intersecting region of the emitter signal and detector field of view. Accordingly, the angled orientation and resulting overlap region are desirable for cliff detection subsystems. In that application, a difference in surface height must be detected clearly, allowing the robot to redirect accordingly, saving the robot from damage. Although the parallel configuration and angled configurations are better suited to wall- and cliff-detection, respectively, the invention contemplates using either configuration for either application.

Figure 8:
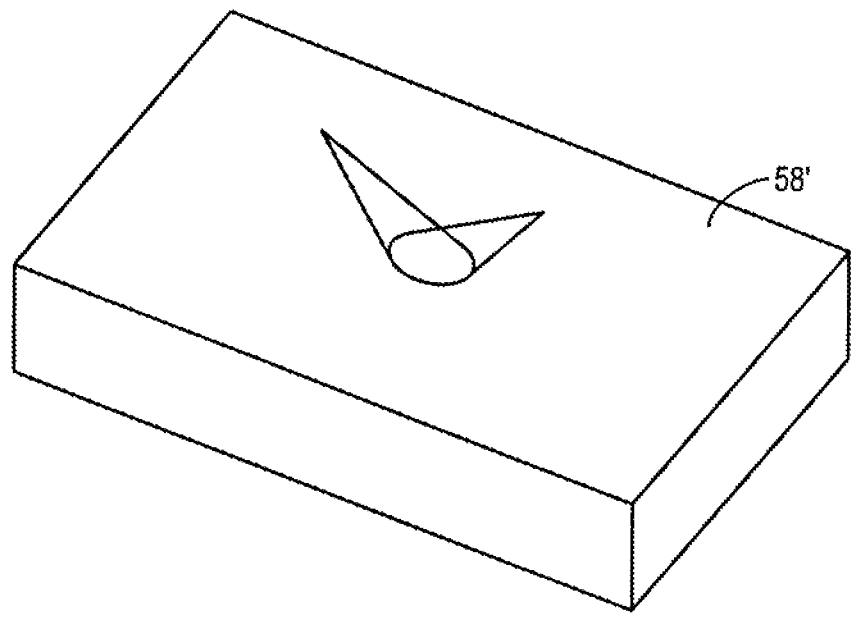
FIG. 8 is a three-dimensional schematic view showing a full overlap of the field of emission of the emitter and the field of view of the detector in accordance with one embodiment of the invention.
Figure 9:
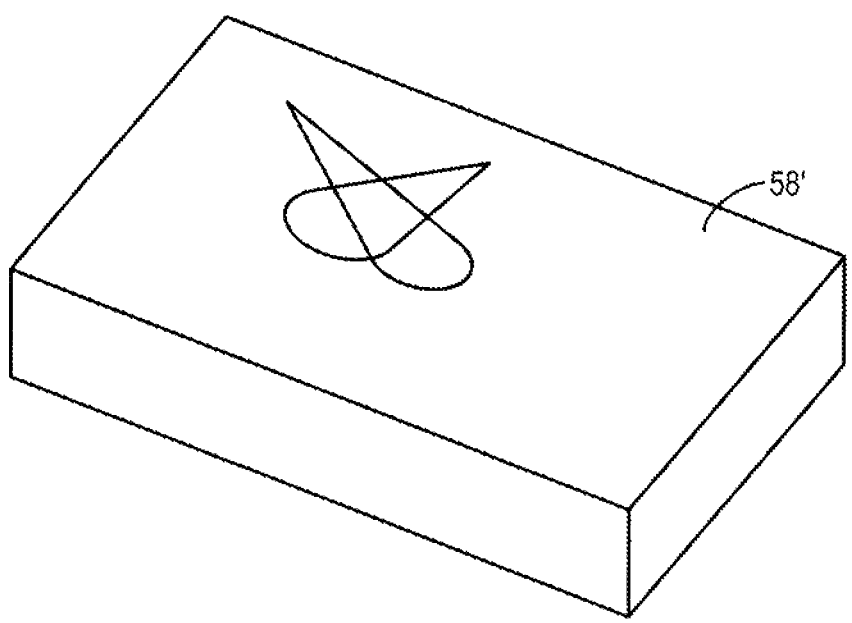
FIG. 9 is a three-dimensional schematic view showing the situation which occurs when there is a minimal overlap between the field of emission and the field of view of one embodiment of the sensor subsystem of the invention.

The sensor subsystem is calibrated such that when floor or surface 58', FIG. 8, is the "normal" or expected distance with respect to the robot, there is a full or a nearly full overlap between the field of emission of the emitter and the field of view of the detector as shown. When the floor or surface is too far away such that the robot can not successfully traverse an obstacle, there is no or only a minimal overlap between the field of emission of the emitter and the field of view of the detector as shown in FIG. 9. The emitter beam and the detector field of view are collimated such that they fully overlap only in a small region near the expected position of the floor. The detector threshold is then set so that the darkest available floor material is detected when the beam and the field of view fully overlap. As the robot approaches a cliff, the overlap decreases until the reflected intensity is below the preset threshold. This triggers cliff avoidance behavior. Highly reflective floor material delays the onset of cliff detection only slightly. By arranging the emitter and detector at 45°. with respect to the floor, the region of overlap as a function of height is minimized. Equal incidence and reflection angles ensure that the cliff detector functions regardless of whether the floor material is specular or diffuse. The size of the overlap region can be selected by choosing the degree of collimation and the nominal distance to the floor. In this way, the logic interface between the sensor subsystem and the control circuitry of the robot is greatly simplified.

By tuning the system to simply redirect the robot when there is no detectable overlap, i.e., when the detector fails to emit a signal, the logic interface required between the sensor subsystem and the control electronics (e.g., a microprocessor) is simple to design and requires no or little signal conditioning. The emitted IR beam may be modulated and the return beam filtered with a matching filter in order to provide robust operation in the presence of spurious signals, such as sunlight, IR-based remote control units, fluorescent lights, and the like. Conversely, for the wall sensor embodiment, the system is tuned to redirect the robot when there is a detectable overlap.

Figures 10, 11:
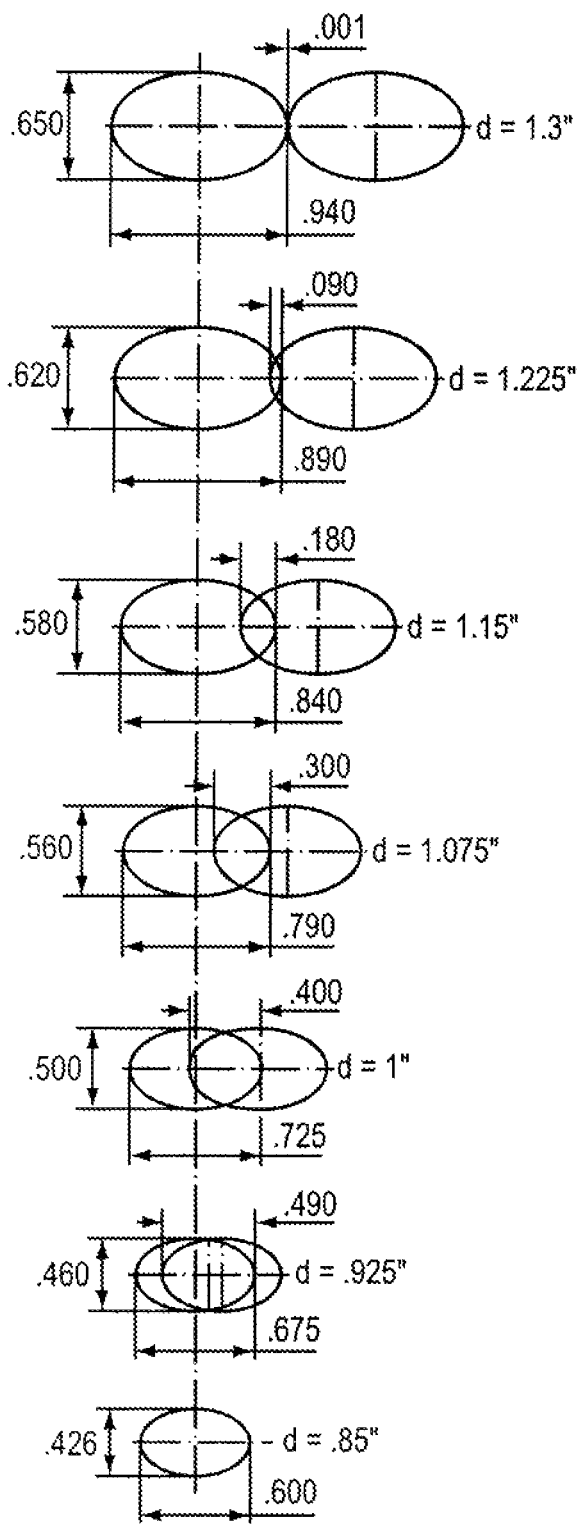
FIG. 10 is a series of views showing, from top to bottom, no overlap between the field of emission and the field of view and then a full overlap of the field of view over the field of emission.
FIG. 11 is a set of figures corresponding to FIG. 10 depicting the area of overlap for each of these conditions shown in FIG. 10.

FIGS. 10-11 provide in graphical form an example of the differences in the area of overlap depending on the height (d) of the sensor subsystem from a surface. The field of emission of the emitter and the field of view of the detector were set to be equal and non-overlapping at a distance (d) of 1.3 inches and each was an ellipse 0.940 inches along the major diameter and 0.650 inches along minor diameter. A full overlap occurred at d=0.85 inches where the resulting overlapping ellipses converge into a single ellipse 0.426 inches along the minor diameter and 0.600 inches along the major diameter. Those skilled in the art will understand how to adjust the field of emission and the field of view and the intersection region between the two to meet the specific design criteria of any robotic device in question. Thus, FIGS. 10 and 11 provide illustrative examples only.

Figure 12:
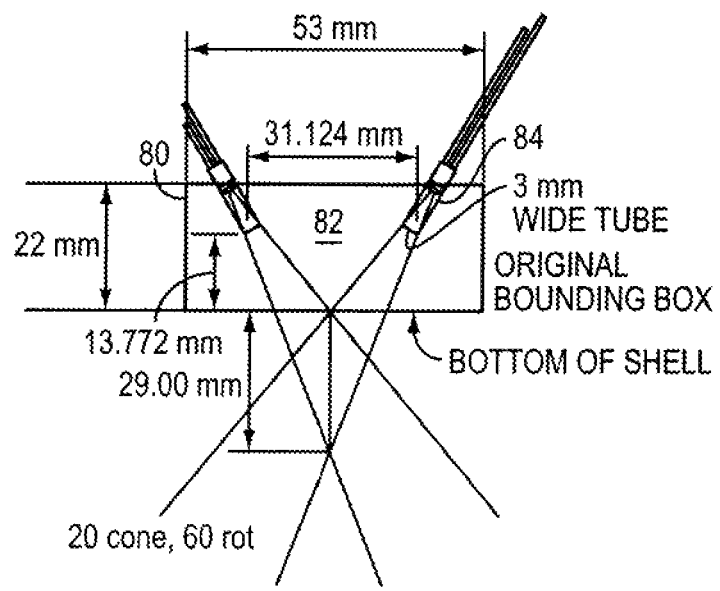
FIG. 12 is a more detailed schematic view of the sensor subsystem according to one embodiment of the invention.

In one embodiment, as shown in FIG. 12, in housing 80 of the sensor subsystem, a rectangular 22 mm by 53 mm by 3 mm diameter plastic emitter collimator tube 82 and 3 mm diameter plastic detector collimator tube 84 were placed 13.772 mm from the bottom of housing 80 which was flush with the bottom of the shell of the robot. The collimators 82, 84 may be either a separate component, or may be integrally formed in the robot housing. This configuration defined field of view and field of emission cones of 20° placed at a 60° angle from each other. The angle between the respective collimator tubes was 60° and they were spaced 31.24 mm apart. This configuration defined a region of intersection between the field of emission and the field of view 29.00 mm long beginning at the bottom of the robot.

Figure 13:
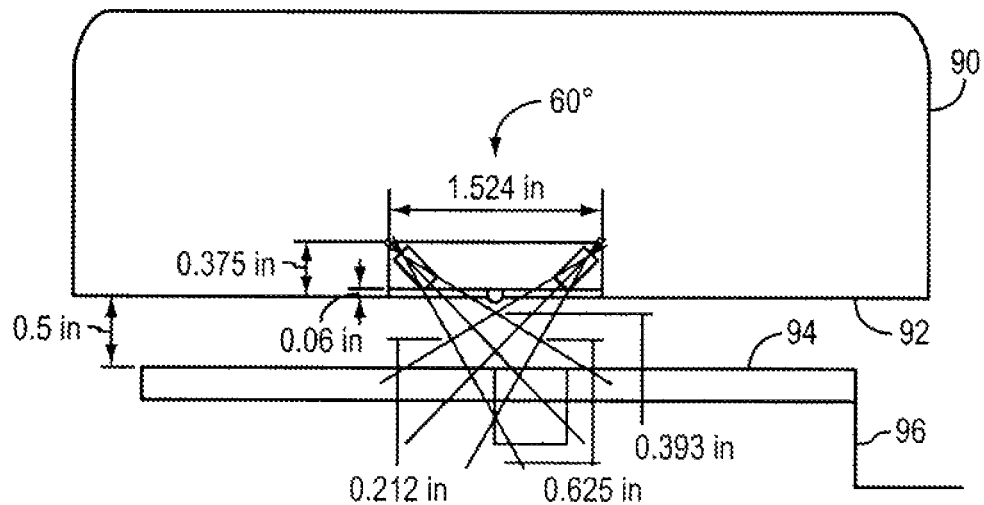
FIG. 13 is a schematic view of the sensor subsystem of FIG. 12 in place on or in a robot in accordance with one embodiment of the invention.

In the design shown in FIG. 13, the sensor subsystem is shown integrated with robot shell or housing 90 with a wheel (not shown) which supports the bottom 92 of shell 90 one-half inch above surface or floor 94. The region of overlap of the field of view and the field of emission was 0.688 inches, 0.393 inches above the surface. Thus, if stair 96 has a drop greater than 0.393 inches, no signal will be output by the detector and the robot redirected accordingly. In one embodiment, the emitter includes an infrared light source and the detector includes an infrared photon detector each disposed in round plastic angled collimators. The emitter, however, may also be a laser or any other source of light.

Figure 14:
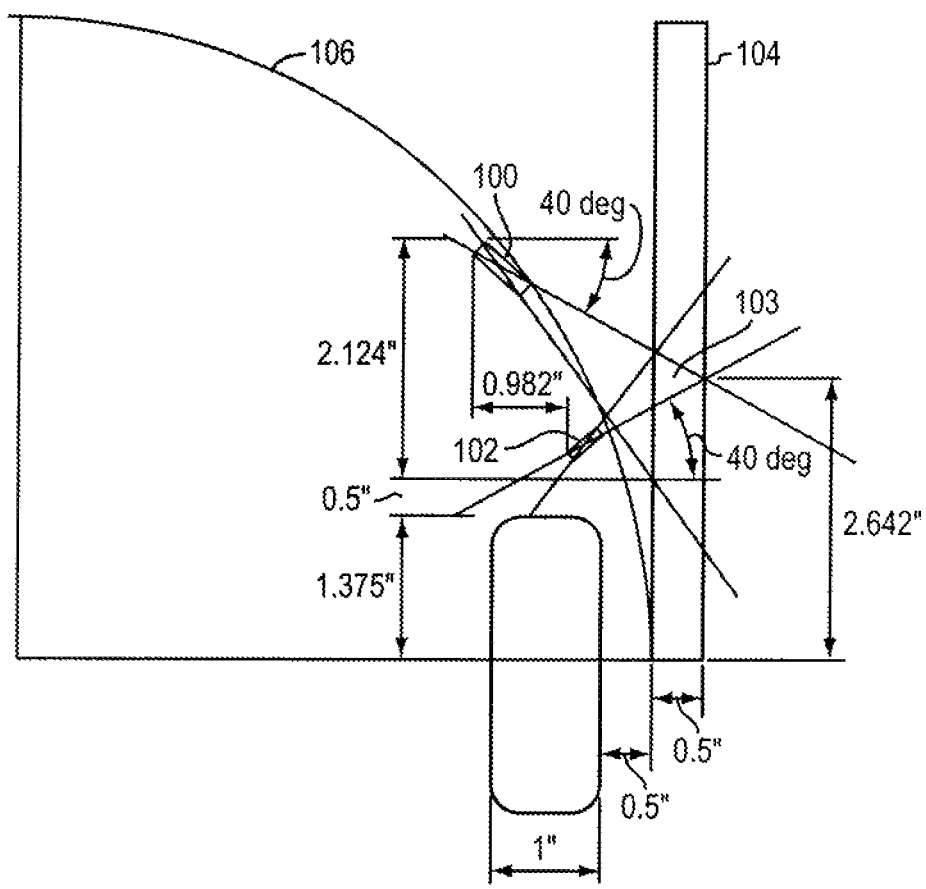
FIG. 14 is a schematic top view of the wall detection system in accordance with one embodiment of the invention in place on the shell or housing of a robot.

For wall detection, emitter 102 and detector 100 are arranged as shown in FIG. 14. The optical axes of the emitter and detector are parallel to the floor on which the robot travels. The field of emission of the emitter and the field of view of the detector are both 22 degree cones. A three millimeter diameter tube produces a cone of this specification when the active element is mounted 0.604 inches from the open end as shown. The optical axes of the emitter and detector intersect at an angle of 80 degrees. The volume of intersection 103 occurs at a point about 2.6 inches ahead of the point of tangency between the robot shell 106 and the wall 104 when the robot is traveling parallel to the wall. The line bisecting the intersection of the optical axes of the emitter and detector is perpendicular to the wall. This ensures that reflections from specular walls are directed from the emitter into the detector.

Figure 15:
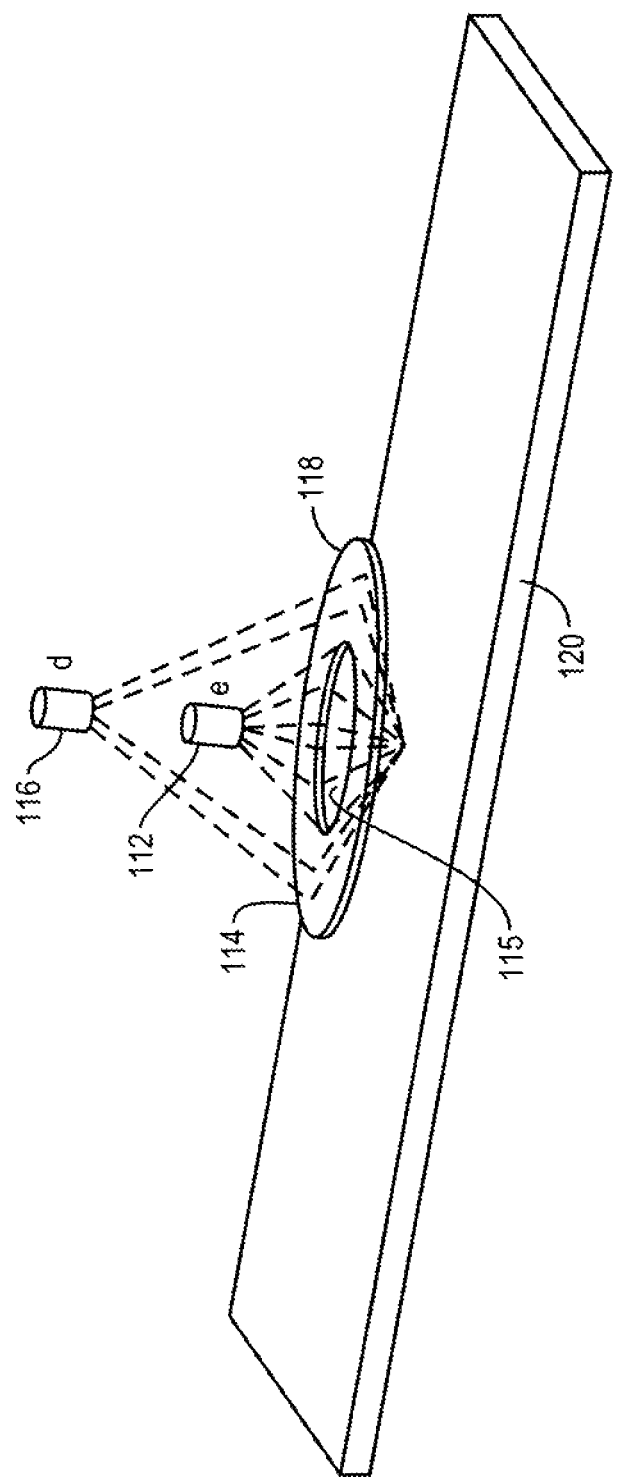
FIG. 15 is a schematic three dimensional view of the sensor system in accordance with another embodiment of the invention.

In another embodiment, depicted in FIG. 15, detector 116 is positioned above emitter 112 and lens 118 with two areas of different curvature 115 and 114 used to focus light from emitter 112 to the same spot as the field of view of detector 116 at only one height above surface 120 so that if the height changes, there is no or at least not a complete overlap between the field of view of detector 116 and emitter 112 as defined by curvature areas 115 and 114. In this situation, the rapid change of reflected intensity with height is provided by focusing two lenses on a single spot. When the floor is in the nominal position relative to the sensor subsystem, the emitter places all its energy on a small spot. The detector is focused on the same spot. As the floor falls away from the nominal position, light reflected into the detector (now doubly out of focus) decreases rapidly. By carefully selecting the lens-to-floor distance and the focal lengths of the two lenses, it is possible for the emitter and detector to be located at different points but have a common focus on the floor. Lens may also be used in connection with the embodiments of FIGS. 5A-7 to better control the shape and/or size of the region of intersection.

Figure 16:
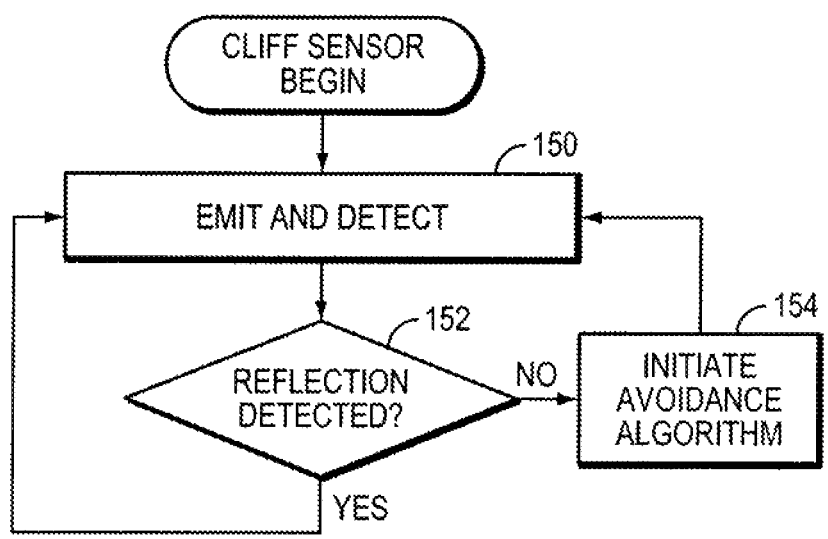
FIG. 16 is a flow chart depicting the primary steps associated with a logic which detects whether a cliff is present in front of the robot in accordance with one embodiment of the invention.

The logic of the circuitry associated with the cliff sensor embodiment modulates the emitter at a frequency of several kilohertz and detects any signal from the detector, step 150, FIG. 16, which is tuned to that frequency. When a signal is not output by the detector, step 152, the expected surface is not present and no overlap is detected. In response, an avoidance algorithm is initiated, step 154, to cause the robot to avoid any interfering obstacle. When a reflected signal is detected, processing continues to step 150.

Figure 17:
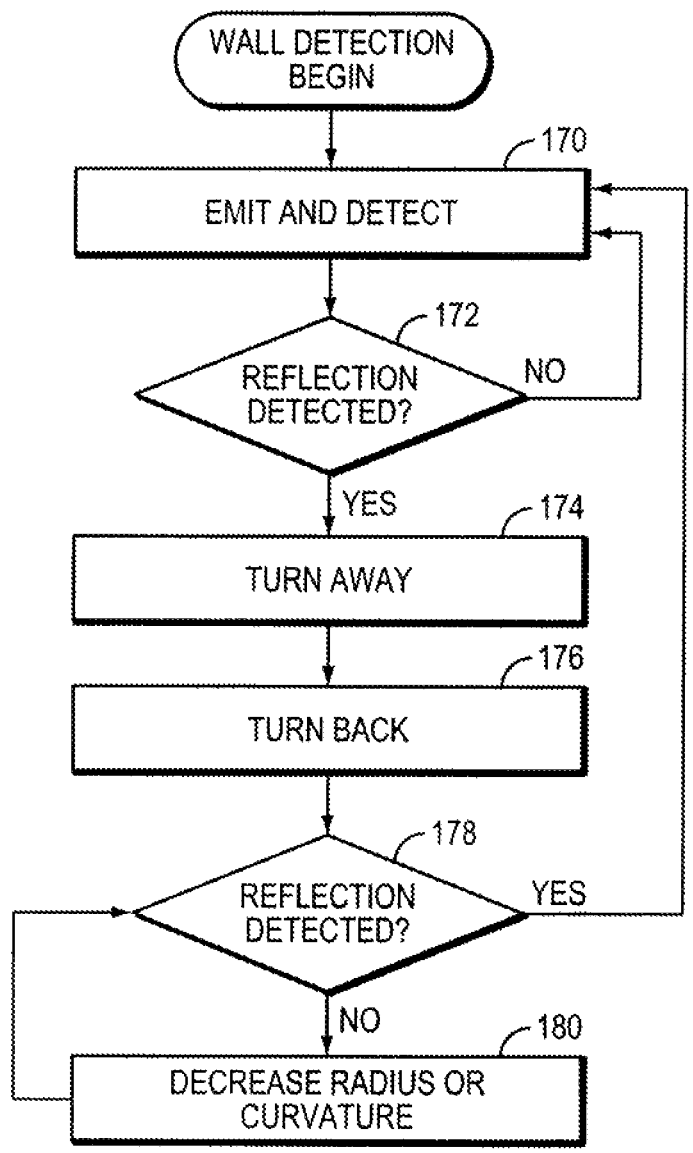
FIG. 17 is a flow chart depicting the primary steps associated with the wall-detection logic in accordance with one embodiment of the invention.

In the wall detection mode, the logic of the circuitry associated with the sensor subsystem modulates the emitter and detects signals from the detector as before, step 170, FIG. 17 until a reflection is detected, step 172. A wall is then next to the robot and the controlling circuitry causes the robot to turn away from the wall, step 174 and then turn back, step 176 until a reflection (the wall) is again detected, step 178. By continuously decreasing the radius of curvature of the robot, step 180, the path of the robot along the wall in the wall-following mode is made smoother.

Figure 18:
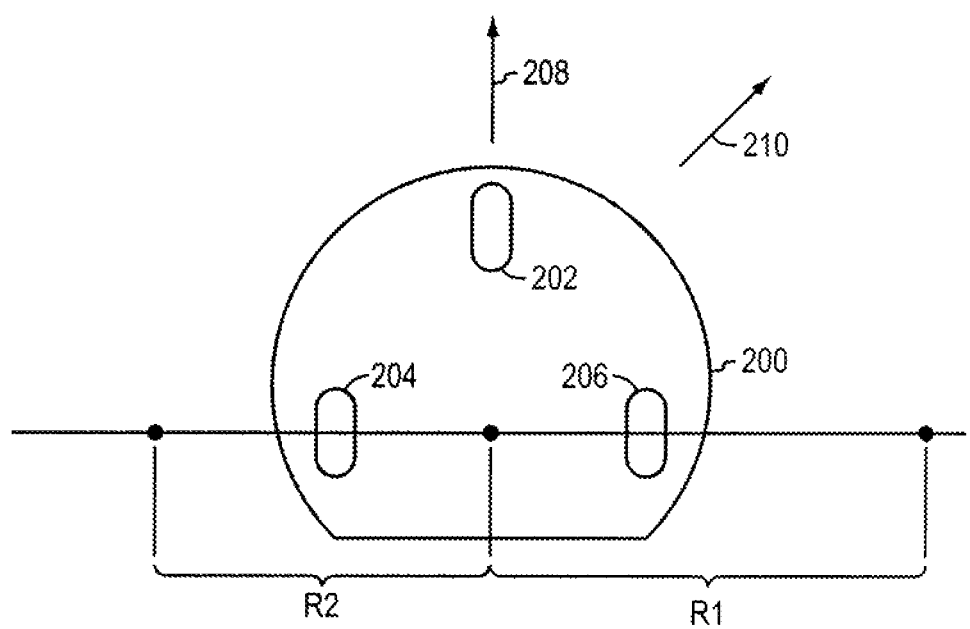
FIG. 18 is a bottom view of a cleaning robot in accordance with one embodiment of the invention configured to turn about curvatures of decreasing radiuses.

As shown in FIG. 18, robot housing 200 includes three wheels 202, 204, and 206 and is designed to only move forward in the direction shown by vector 208. When a wall is first detected (step 172, FIG. 17), the robot turns away from the wall in the direction of vector 210 and then turns back towards the wall rotating first about radius $R_1$ and then about radius $R_2$ and then about smoothly decreasing radius points (steps 178-180, FIG. 17) until the wall is again detected. This discussion assumes the detector is on the right of robot housing 200.

Figure 19:
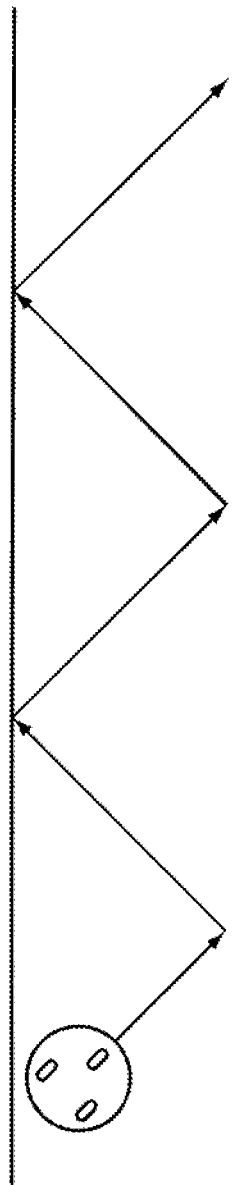
FIG. 19 is a schematic top view showing the abrupt turns made by a robot in the wall-following mode when the wall-following algorithm of an embodiment of the invention is not employed.

As shown in FIG. 19, if only one constant radius of curvature was chosen, the robot's travel path along the wall would be a series of abrupt motions. In contrast, by continuously reducing the radius of curvature as the robot moves forward back to the wall in accordance with the subject invention, the robot's travel path along the wall is relatively smooth as shown in FIG. 20A.

FIGS. 20B-20G depict a sequence corresponding to a corner-turning behavior of an autonomous robot 600. The corner-turning behavior allows the robot 600 to turn smoothly about an outside corner 612 without colliding with the corner 612 or the wall 614. Avoiding unnecessary collisions helps to improve cleaning efficiency and enhances users' perception of the robot's effectiveness.

The robot 600 depicted in FIGS. 20B-20G includes at least one wall sensor 602 and two drive wheels, described with respect to the wall 614 as a outside wheel 604 and a inside wheel 606. The wheels are aligned on a common axis 610. The signal 608 may be either a reflected signal projected by a corresponding emitter (in the sensor 602) or may be the signal received as a result of the ambient light, obstacle reflectivity, or other factors. In this embodiment, the sensor 602 is oriented approximately perpendicular to both the robot's general direction of motion $M_G$ and the wall 614. The sensor is located a distance X forward of the common axis 610 of the robot's drive wheels 604, 606. In this embodiment, X equals approximately three inches, but may be any distance based on the size of the robot 600, the robot's application, or other factors.

Figure 20A:
FIG. 20A is a view similar to FIG. 19 except that now the wall-following algorithm of one embodiment of the invention is employed to smooth out the path of the robotic cleaning device in the wall-following mode.
Figure 20B:
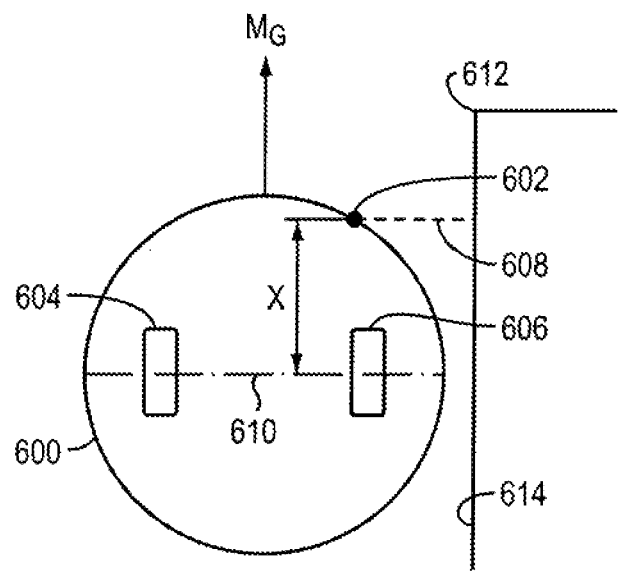
FIGS. 20B-20G depict a sequence wherein a mobile robot operates a wall-following, corner-turning algorithm in accordance with one embodiment of the invention.
Figure 20C:
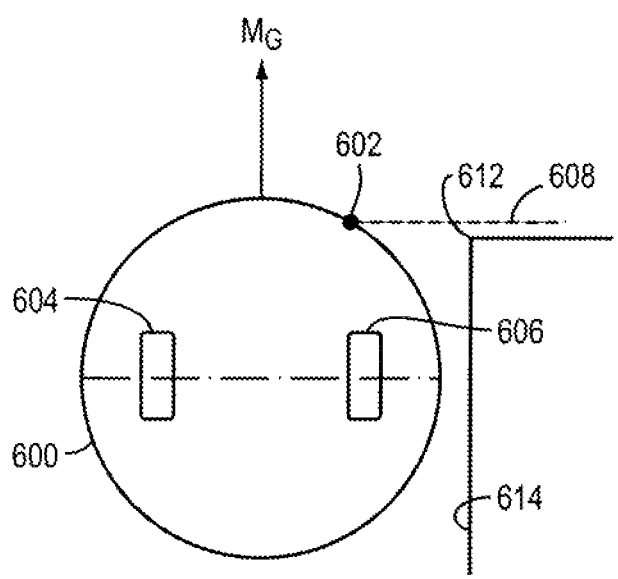

During the wall-following operation depicted in FIGS. 20A and 20B, the robot 600 servos on the analog signal from the sensor 602. That is, while moving generally forward along $M_G$ along the wall 614, the robot 600 turns slightly toward or away from the wall as the signal 608 decreases or increases, respectively. FIG. 20C depicts the condition when the robot 600 reaches an outside corner 612 and the signal 608 suddenly decreases to a low or zero value. When this occurs, the robot 600 triggers its corner-turning behavior. In an alternative embodiment, or in addition to the corner-turning behavior described below, the robot may turn immediately in an effort to bump the wall 614, allowing it to confirm the presence or absence of the wall 614. If the signal 608 remains low or at zero, but the bump sensor continues to activate, the robot would be able to self-diagnose a failed wall sensor 602.

Figure 20D:
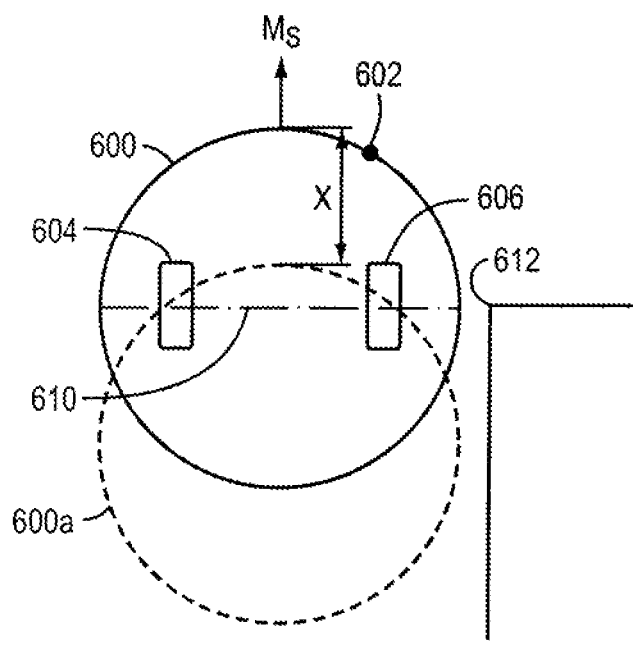
Figure 20E:
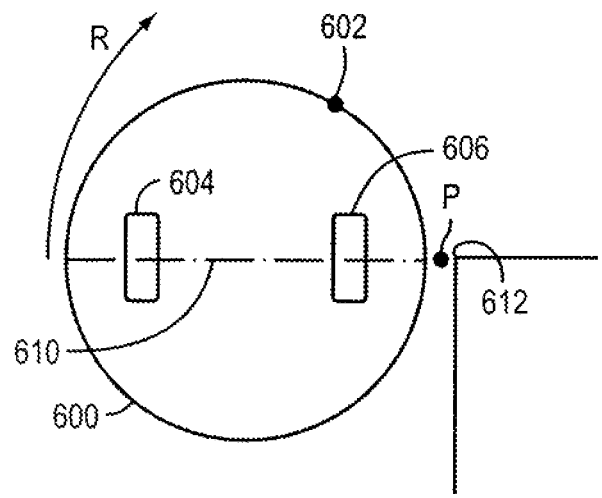

FIG. 20D depicts the initial step of corner-turning behavior, when the robot 600 first ceases servoing on the wall (i.e., moving generally forward $M_G$—the robot's last position while servoing is shown by dashed outline 600a) and moves straight $M_S$ ahead. The robot moves straight ahead $M_S$ a distance equal to the distance X between the servo sensor 602 and the drive wheel axis 610 (in this embodiment, approximately three inches). The drive wheel axis 610 now approximately intersects the corner 612. At this stage the robot 600 begins to rotate R about a point P located to the outside of the inside wheel 606 near the corner 612, as depicted in FIG. 20E. The distance from the inside wheel 606 to the point P can be selected in various ways. In one embodiment, the point P is approximately one inch from the inside drive wheel 606. This distance allows the robot 600 to turn, without collision, about an outside corner 612 of any angle or even a standard-width door. In the case of a door the robot 600 would make a 180-degree turn.

Figure 20F:
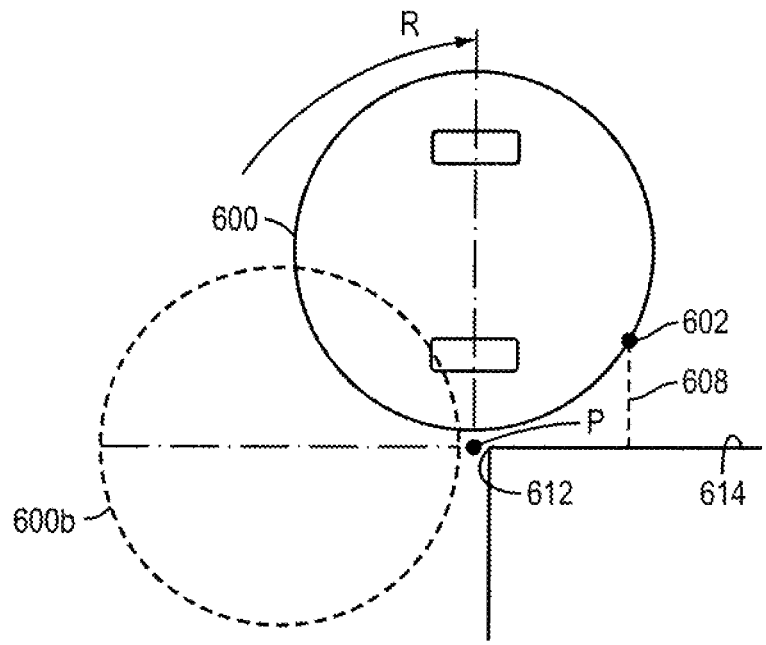
Figure 20G:
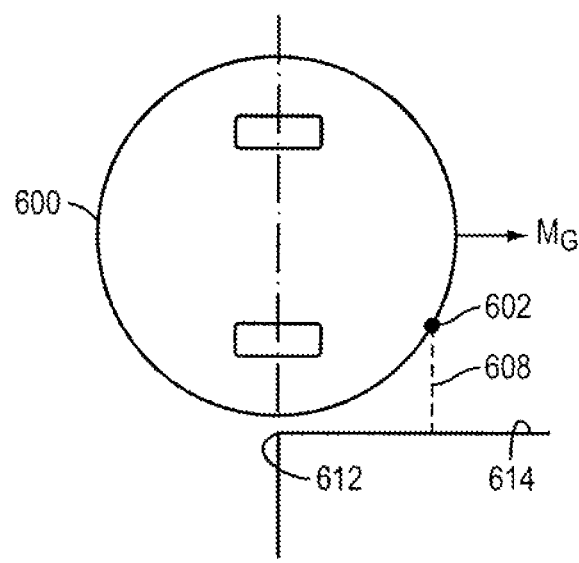

The robot 600 continues to rotate in a direction R about the rotation point P until one of three events occurs. FIG. 20F (showing with a dashed outline 600b, the position of the robot at rotation initiation) depicts the first scenario, where the signal 608 from the sensor 602 becomes high. Here, the robot 600 assumes it has found a wall 614. The robot 600 resumes the wall-following behavior, servoing on the wall 614, and moving generally forward $M_G$, as depicted in FIG. 20G. In a second scenario, the robot's bump sensor activates while rotating, at which time the robot may realign itself to the wall and begin following or, depending on other behaviors, the robot may abandon wall-following. The third scenario occurs if the robot turns nearly a complete circle or other predetermined angle without encountering a wall. The robot will assume it has "lost" the wall and can abandon wall-following mode.

Figure 21A:
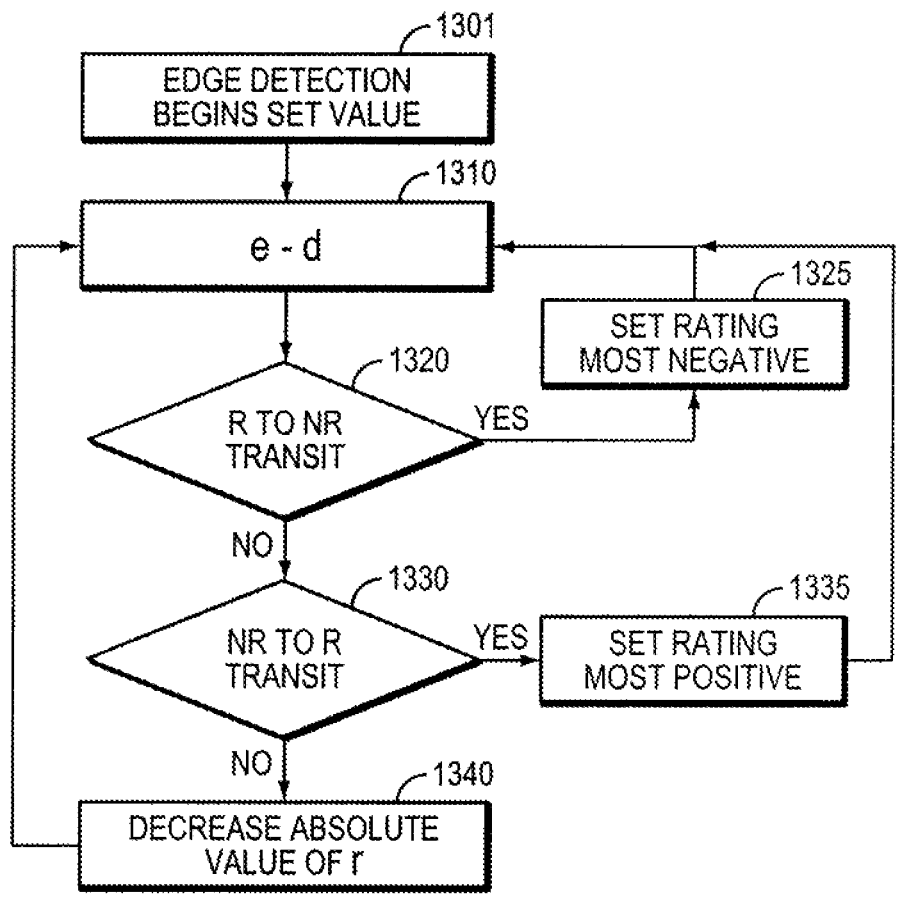
FIG. 21A is a flow-chart illustration of the obstacle-following algorithm of an embodiment of the invention.

The method used in one embodiment for following the wall is explained with reference to FIG. 21A and provides a smooth wall-following operation even with a one-bit sensor. (Here the one-bit sensor detects only the presence of absence of the wall within a particular volume rather than the distance between wall and sensor.) Other methods of detecting a wall or object can be used, such as bump sensing or sonar sensors.

Once the wall-following operational mode, or wall-following behavior of one embodiment, is initiated (step 1301), the robot first sets its initial value for the steering at $r_0$. The wall-following behavior then initiates the emit-detect routine in the wall-follower sensor (step 1310). The existence of a reflection for the IR transmitter portion of the sensor translates into the existence of an object within a predetermined distance from the sensor. The wall-following behavior then determines whether there has been a transition from a reflection (object within range) to a non-reflection (object outside of range) (step 1320). If there has been a transition (in other words, the wall is now out of range), the value of r is set to its most negative value and the robot will veer slightly to the right (step 1325). The robot then begins the emit-detect sequence again (step 1310). If there has not been a transition from a reflection to a non-reflection, the wall-following behavior then determines whether there has been a transition from non-reflection to reflection (step 1330). If there has been such a transition, the value of r is set to its most positive value and the robot will veer slightly left (step 1335). In one embodiment, veering or turning is accomplished by driving the wheel opposite the direction of turn at a greater rate than the other wheel (i.e., the left wheel when veering right, the right wheel when veering left). In an alternative embodiment, both wheels may drive at the same rate, and a rearward or forward caster may direct the turn.

In the absence of either type of transition event, the wall-following behavior reduces the absolute value of r (step 1340) and begins the emit-detect sequence (step 1310) anew. By decreasing the absolute value of r, the robot 10 begins to turn more sharply in whatever direction it is currently heading. In one embodiment, the rate of decreasing the absolute value of r is a constant rate dependant on the distance traveled.

Figure 21B:
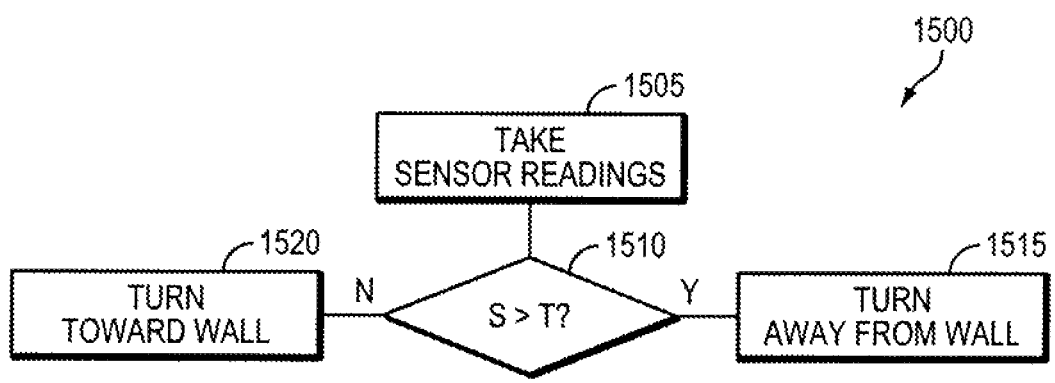
FIG. 21B is a flow-chart illustration of the obstacle-following algorithm of another embodiment of the invention.
Figure 21C:
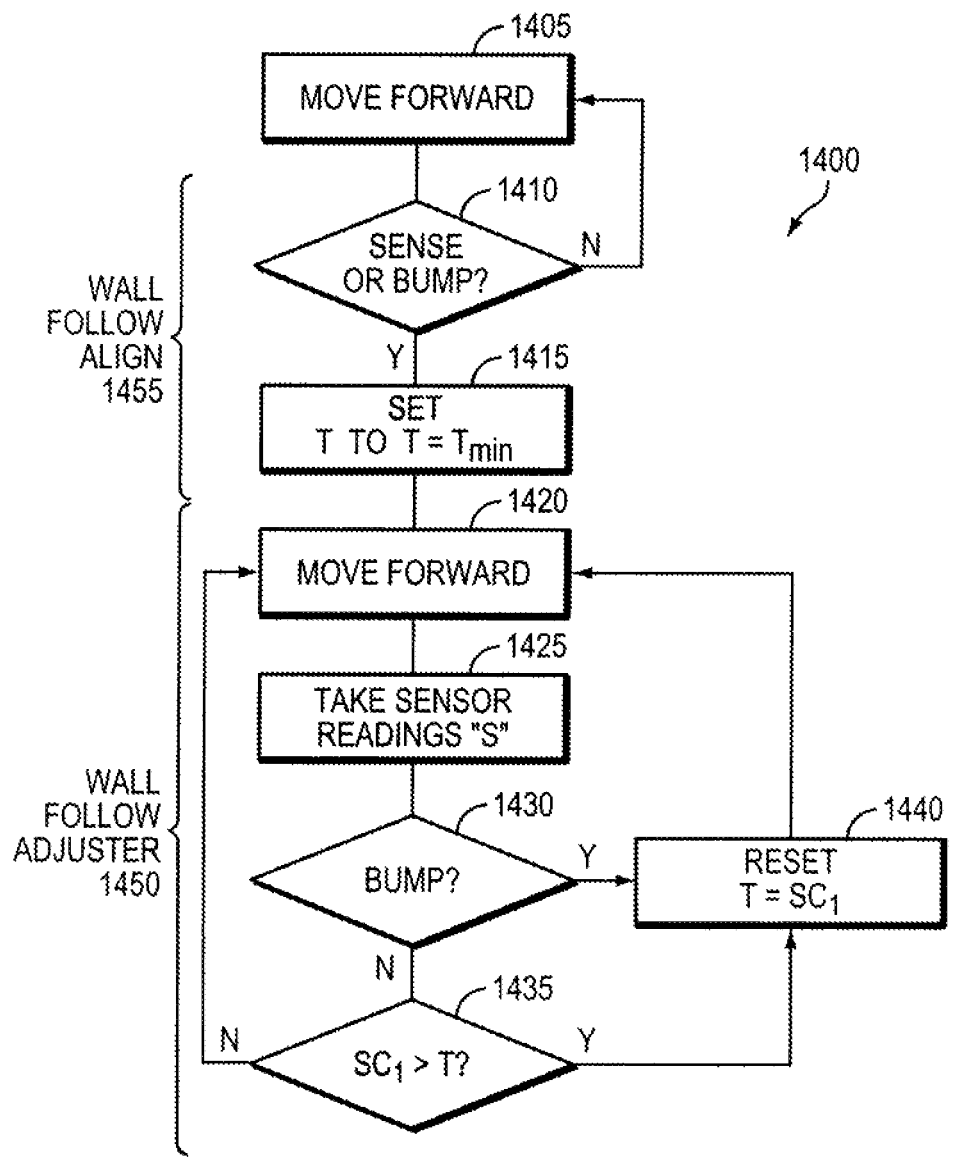
FIG. 21C is a flow-chart illustration of the threshold-adjustment subroutine of the algorithm depicted in FIG. 21B.

FIG. 21B, depicts another embodiment of the obstacle-following algorithm 1500 of the invention. The microprocessor takes sensor readings (step 1505) and monitors the strength of the signal detected by the wall-following sensor (S) against constantly updated and adjusted threshold values (T) (step 1510). The threshold adjustment algorithm is depicted in FIG. 21C, described below. In general, in order to follow along an obstacle, the robot is running a behavior that turns away from the wall if the sensor reading is greater than the threshold value (step 1515), and turns toward the wall if the sensor reading is less than the threshold value (step 1520). In certain embodiments, the value of the difference between S and T can be used to set the radius of the robot's turn, thereby reducing oscillations in wall-follow mode.

FIG. 21C depicts an embodiment of the threshold-adjustment subroutine utilized with the obstacle-following algorithm depicted in FIG. 21B. In this embodiment, the synchronous detection scheme 1400 inputs directly into the A/D port on the microprocessor of the robot. This allows sensor values (not merely the presence or absence of a wall, as described in FIG. 21A) to be used. The synchronous detection allows readings to be taken with and without the emitter powered, which allows the system to take into account ambient light.

FIG. 21C depicts the steps of setting and adjusting the threshold value (T). The program 1400 may run while the robot is in wall-following (or obstacle-following) mode. In the depicted embodiment, the robot is moving forward (step 1405) in any operational mode. The term "forward," is used here to describe any operational mode or behavior that is not the wall- or obstacle-following mode described herein. Such modes or behaviors include spiral, straightline, and bounce (or random) as described in U.S. Pat. No. 6,809,490, even though that movement does not consist solely of movement in a single direction. Entering wall-following mode occurs after the robot has sensed an obstacle through its optical or tactile sensors (step 1410). It is therefore assumed, at the time program 1400 begins, the robot is adjacent to a wall or obstacle. When the robot enters wall-following mode, it first sets the threshold value to a minimum level, $T_{min}$ (step 1415), and aligns the robot initially along the wall and begins moving along the wall (step 1420). The system then takes sensor readings (step 1425). In one embodiment, the detection scheme (step 1425) involves taking four readings and averaging the results. Additional filtering of the sensor input can be used to remove localized changes in the wall surface (e.g., spots of dirt, patches of missing or altered paint, dents, etc.)

The system then looks for either of two conditions to reset the threshold (T): (i) a bump event (i.e. contact with the wall) (step 1430) or (ii) if S times $C_1$ exceeds T (step 1435), where in one embodiment $C_1$ is 0.5. In general, $C_1$ should be between 0 and 1, where a higher value causes the robot to follow closer to the wall. If T is to be reset, it is set to $SC_1$ (step 1440). If neither condition is met, the system continues to move along the wall (step 1420) and take additional sensor readings (step 1425).

In the embodiment of the threshold-adjustment algorithm depicted in FIG. 21C, the process called "wall-follow-adjuster" 1450 is constantly updating the threshold (T) based on the current signal from the wall sensor (S). The behavior called "wall-follow-align" 1455 initializes the threshold on a bump or sensor detection of a wall or other obstacle (step 1410). Near the beginning of this algorithm, it sets the threshold (step 1415) based on the sensor signal without the check done in the "wall-follow-adjuster" process (i.e., step 1435) that ensures that the new threshold is higher (step 1440).

Other embodiments of the wall-following sensor and system include the ability to vary the power or sensitivity of the emitter or detector. A stronger emitted signal, for example, would allow the robot to effectively follow the contours of a wall or other obstacle at a further distance. Such an embodiment would allow a robot to deliberately mop or vacuum, for example, an entire large room following the contours of the wall from the outer wall to the innermost point. This would be an extremely efficient way to clean large rooms devoid of furniture or other obstructions, such as ballrooms, conference centers, etc.

The sensor system may also take readings at various distances from the wall (e.g., at the wall and after a small amount of movement) to set the threshold. Such an embodiment would be particularly useful to increase the likelihood that the robot never touch obstacles (such as installation art pieces in museums) or walls in architecturally sensitive buildings (such as restored mansions and the like). Other embodiments of the wall detection system use multiple receivers at different distances or angles so as to accommodate differences caused by various reflective surfaces or single surfaces having different reflectivities due to surface coloration, cleanliness, etc. For example, some embodiments may have multiple detectors set at different depths and/or heights within the robot housing.

Other embodiments of the sensor subsystem may utilize an emitter to condition the value of the signal that corresponds to an object. For example, the detection sequence may include emitting a signal from an LED emitter and detecting the signal and corresponding value. The system may then detect a signal again, without emitting a corresponding signal. This would allow the robot to effectively minimize the effect of ambient light or walls of different reflectivities.

The wall-follower mode can be continued for a predetermined or random time, a predetermined or random distance, or until some additional criteria are met (e.g., bump sensor is activated, etc.). In one embodiment, the robot continues to follow the wall indefinitely. In another embodiment, minimum and maximum travel distances are determined, whereby the robot will remain in wall-following behavior until the robot has either traveled the maximum distance or traveled at least the minimum distance and encountered an obstacle. This implementation of wall-following behavior ensures the robot spends an appropriate amount of time in wall-following behavior as compared to its other operational modes, thereby decreasing systemic neglect and distributing coverage to all areas. By increasing wall-following, the robot is able to move in more spaces, but the robot is less efficient at cleaning any one space. In addition, by exiting the wall-following behavior after obstacle detection, the robot increases the users' perceived effectiveness.

Figure 22:
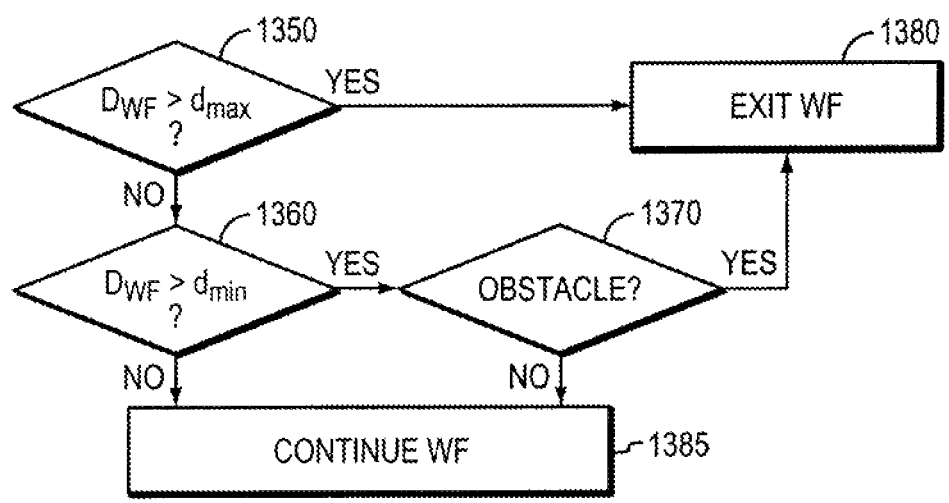
FIG. 22 is a flow-chart illustration of an algorithm for determining when to exit the obstacle following mode.

FIG. 22 is a flow-chart illustration showing an embodiment of determining when to exit wall-following behavior. The robot first determines the minimum distance to follow the wall ($d_{min}$) and the maximum distance to follow the wall ($d_{max}$). While in wall (or obstacle) following mode, the control system tracks the distance the robot has traveled in that mode ($d_{wf}$). If $d_{wf}$ is greater than $d_{max}$ (step 1350), then the robot exits wall-following mode (step 1380). If, however, $d_{wf}$ is less than $d_{max}$ (step 1350) and $d_{wf}$ is less than $d_{max}$. (step 1360), the robot remains in wall-following mode (step 1385). If $d_{wf}$ is greater than $d_{min}$ (step 1360) and an obstacle is encountered (step 1370), the robot exits wall-following mode (step 1380).

Theoretically, the optimal distance for the robot to travel in wall-following behavior is a function of room size and configuration and robot size. In a preferred embodiment, the minimum and maximum distance to remain in wall-following are set based upon the approximate room size, the robot's width and a random component, where by the average minimum travel distance is 2 w/p, where w is the width of the work element of the robot and p is the probability that the robot will enter wall-following behavior in a given interaction with an obstacle. By way of example, in one embodiment, w is approximately between 15 cm and 25 cm, and p is 0.095 (where the robot encounters 6 to 15 obstacles, or an average of 10.5 obstacles, before entering an obstacle following mode). The minimum distance is then set randomly as a distance between approximately 115 cm and 350 cm; the maximum distance is then set randomly as a distance between approximately 170 cm and 520 cm. In certain embodiments the ratio between the minimum distance to the maximum distance is 2:3. For the sake of perceived efficiency, the robot's initial operation in an obstacle-following mode can be set to be longer than its later operations in obstacle following mode. In addition, users may place the robot along the longest wall when starting the robot, which improves actual as well as perceived coverage.

The distance that the robot travels in wall-following mode can also be set by the robot depending on the number and frequency of objects encountered (as determined by other sensors), which is a measure of room "clutter." If more objects are encountered, the robot would wall follow for a greater distance in order to get into all the areas of the floor. Conversely, if few obstacles are encountered, the robot would wall follow less in order to not over-cover the edges of the space in favor of passes through the center of the space. An initial wall-following distance can also be included to allow the robot to follow the wall a longer or shorter distance during its initial period where the wall-following behavior has control.

In one embodiment, the robot may also leave wall-following mode if the robot turns more than, for example, 270 degrees and is unable to locate the wall (or object) or if the robot has turned a total of 360 degrees since entering the wall-following mode.

In certain embodiments, when the wall-following behavior is active and there is a bump, the align behavior becomes active. The align behavior turns the robot counter-clockwise to align the robot with the wall. The robot always turns a minimum angle. The robot monitors its wall sensor and if it detects a wall and then the wall detection goes away, the robot stops turning. This is because at the end of the wall follower range, the robot is well aligned to start wall-following. If the robot has not seen its wall detector go on and then off by the time it reaches its maximum angle, it stops anyway. This prevents the robot from turning around in circles when the wall is out of range of its wall sensor. When the most recent bump is within the side 60 degrees of the bumper on the dominant side, the minimum angle is set to 14 degrees and the maximum angle is 19 degrees. Otherwise, if the bump is within 30 degrees of the front of the bumper on the dominant side or on the non-dominant side, the minimum angle is 20 degrees and the maximum angle is 44 degrees. When the align behavior has completed turning, it cedes control to the wall-following behavior.

For reasons of cleaning thoroughness and navigation, the ability to follow walls is essential for cleaning robots. Dust and dirt tend to accumulate at room edges. The robot therefore follows walls that it encounters to insure that this special area is well cleaned. Also, the ability to follow walls enables a navigation strategy that promotes full coverage. Using this strategy, the robot can avoid becoming trapped in small areas. Such entrapments could otherwise cause the robot to neglect other, possibly larger, areas.

But, it is important that the detected distance of the robot from the wall does not vary according to the reflectivity of the wall. Proper cleaning would not occur if the robot positioned itself very close to a dark-colored wall but several inches away from a light-colored wall. By using the dual collimation system of the subject invention, the field of view of the infrared emitter and detector are restricted in such a way that there is a limited, selectable volume where the cones of visibility intersect. Geometrically, the sensor is arranged so that it can detect both diffuse and specular reflection. Additionally, a manual shutter may be utilized on or in the robot housing to further limit the intersection of the cones of visibility or adjust the magnitude of the detected signal. This arrangement allows the designer to select with precision the distance at which the robot follows the wall independent of the reflectivity of the wall.

Figure 23:
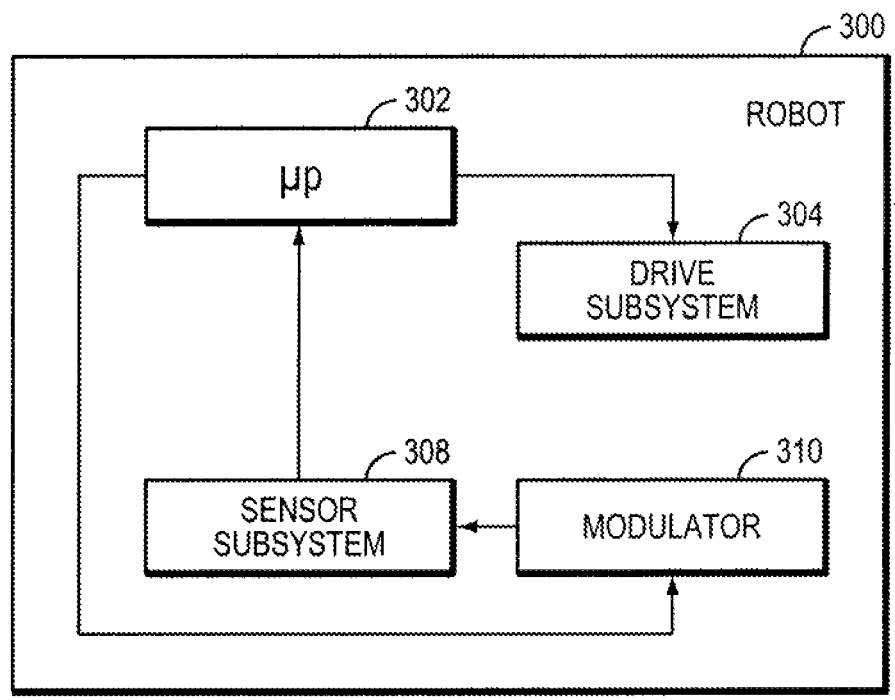
FIG. 23 is a block diagram showing the various components associated with a robotic cleaning device.

One robot system 300, FIG. 23, in accordance with this invention includes a circuit embodied in microprocessor 302 which controls drive motion subsystem 304 of robot 300 in both the random movement and wall-following modes to drive and turn the robot accordingly. Sensor subsystem 308 represents the designs discussed above with respect to FIGS. 5A-15. The detectors of each such subsystem provide an output signal to microprocessor 302 as discussed supra which is programmed according to the logic discussed with reference to FIGS. 16-17 to provide the appropriate signals to drive subsystem 304. Modulator circuitry 310 drives the emitters of the sensor subsystem 308 under the control of processor 302 as discussed above.

Figure 24:
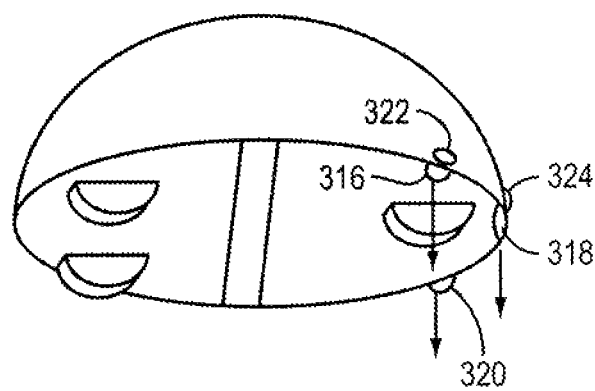
FIG. 24 is a schematic three-dimensional view of a robotic cleaning device employing a number of cliff sensors and wall sensors in accordance with one embodiment of the invention.

There may be three or more cliff-detector subsystems, as shown in FIG. 24, at locations 316, 318, and 320 spaced about the forward bottom portion of the robot and aimed downward and only one or two or more wall detector subsystems at locations 322 and 324 spaced about the forward portion of the robot housing and aimed outwardly.

Figure 25:
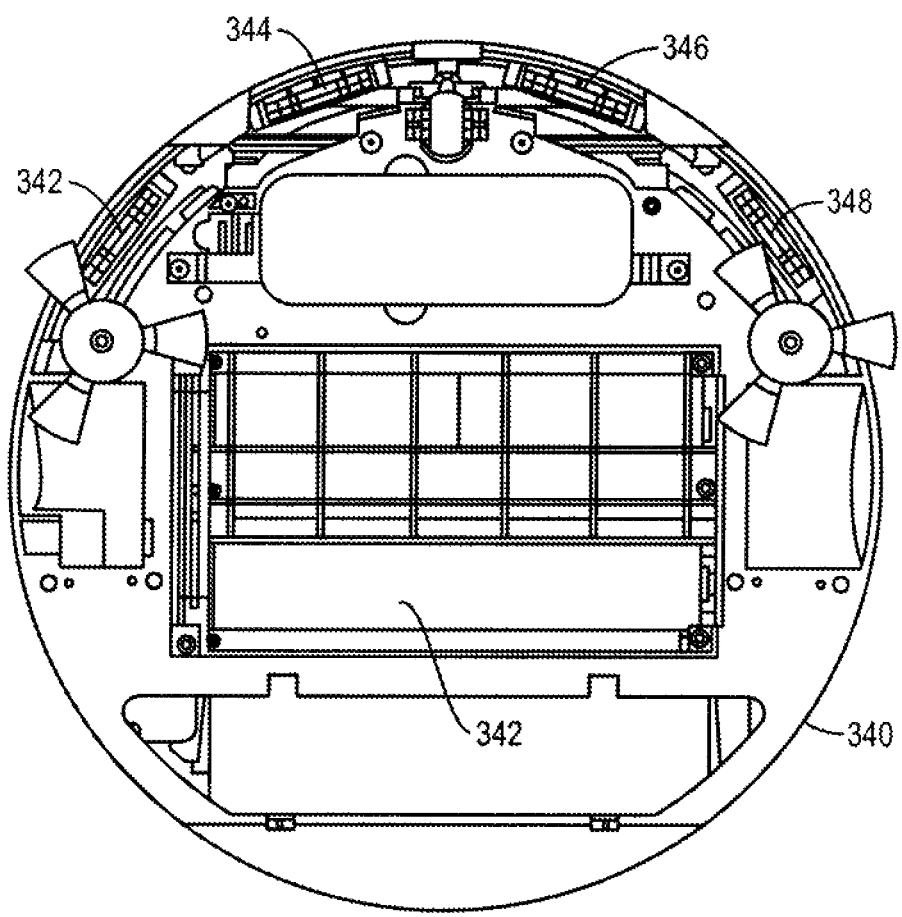
FIG. 25 is a bottom view of one particular robotic cleaning device and the cliff sensors incorporated therewith in accordance one embodiment of the invention.
Figure 26:
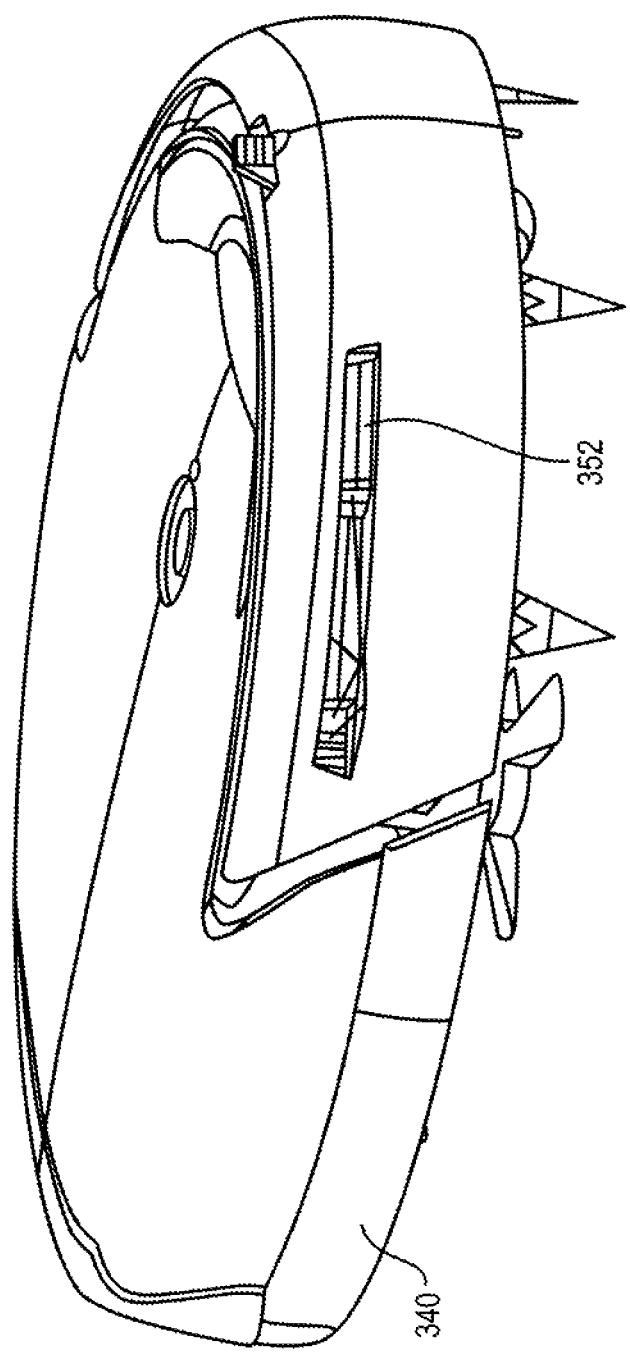
FIG. 26 is a side view of the robot of FIG. 25, further incorporating wall-following sensors in accordance with one embodiment of the invention.

In one embodiment, depicted in FIG. 25, a 12-inch diameter, three-wheeled, differentially-steered robot 340, is a sweeper-type cleaning robot equipped with sweeping brush 342 and includes four cliff-detector subsystems 342, 344, 346, and 348 and one wall-detector subsystem 352, FIG. 26. The output of the detectors of each subsystem are typically connected together by "OR" circuitry logic so that when any one detector detects a signal it is communicated to the processor.

Figure 27A:
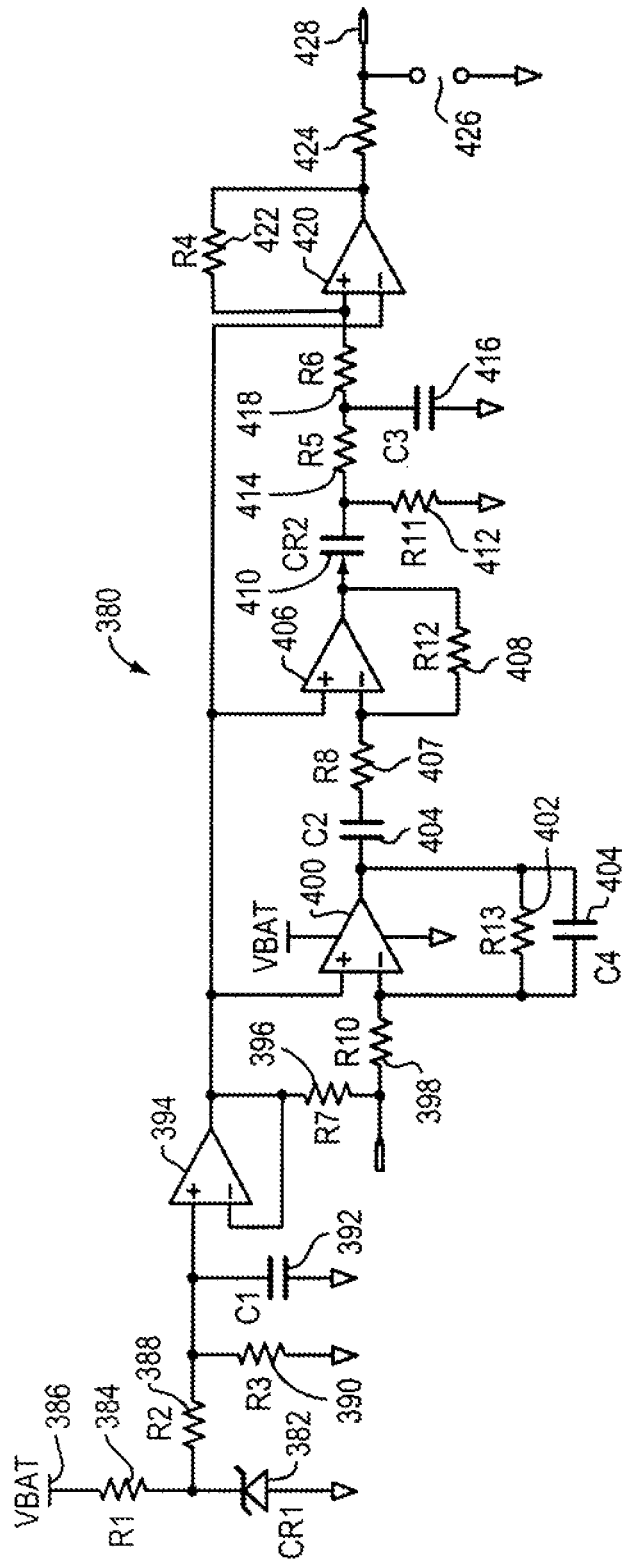
FIG. 27A is a circuit diagram for the detector circuit of one embodiment of the invention.

FIG. 27A shows one embodiment of a detector circuit. R1 (384), CR1 (382), R2 (388), R3 (390), C1 (392), and U1:D (394) form a voltage reference used to prevent saturation of intermediate gain stages. In this embodiment, R1 (384) and CR1 (382) create from the input voltage (386) approximately 5.1V that is divided by voltage divider R2 (388), R3 (390) to create a voltage of approximately 1.8V. This is buffered by U1:D (394) configured as a unity gain follower. C1 (392) is provided to reduce noise. The photo-transistor (not shown) used in this embodiment requires a biasing current, provided from the above-described reference voltage through R7 (396). R10 (398), R13 (402), and U1:A (400) implement an amplifier with a gain of approximately −10. C4 (404) is provided for compensation and to reduce noise.

C2 (404) is used to block any DC component of the signal, while R8 (407), R12 (408), and U1:B (406) implement an amplifier with a gain of approximately −100. CR2 (410), R5 (414), and C3 (416) implement a peak detector/rectifier. R11 (412) provides a discharge path for C3 (416). The output of this peak detector is then compared to the above mentioned reference voltage by U1:C (420). R4 (422) provide hystersis. R9 (424) is a current limiting resistor used so that the output of U1:C (420) may be used to drive an indicator LED (not shown). Jumper JU1 (426) provides a convenient test point for debugging.

Figure 28:
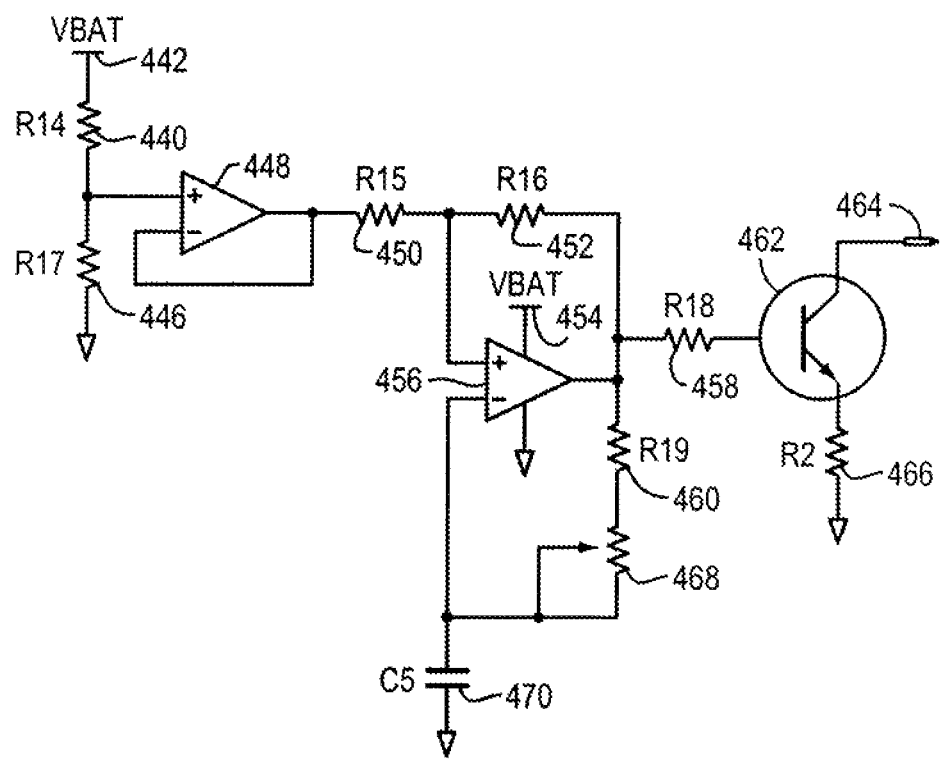
FIG. 28 is a circuit diagram for the oscillator circuit of one embodiment of the invention.

An oscillator circuit as shown in FIG. 28 is used to modulate the emitter IR LED at a frequency of several kHz. The exact frequency may be selected by adjusting R23 (468). Those skilled in the art will immediately deduce other ways of obtaining the same function. The simple filter/amplifier circuit of FIG. 27A is used to receive and amplify the output of a photo-transistor (not shown). A peak detector/integrator is used to convert the AC input to a threshold measurement. If sufficient energy in the selected bandwidth is received, the output signal is present at (428) is driven to a logical high state. Those skilled in the art will immediately recognize other ways of achieving the same ends. Components R14 (440), R17 (446), and U2:B (448) create a buffered bias voltage equal to approximately one-half of the input voltage (442). U2:A (456), R19 (460), R23 (468), and C5 (470) create a simple oscillator of a form commonly used. R18 (458), Q1 (462), and R21 (466) convert the voltage-mode oscillations of the oscillator described to current-mode oscillations in order that the emitter LED (connected to 464) be relatively constant current regardless of power supply voltage (442). The actual current impressed through the circuit may be altered to meet the requirements of the chosen LED by varying the value of R21 (466).

Figure 27B:
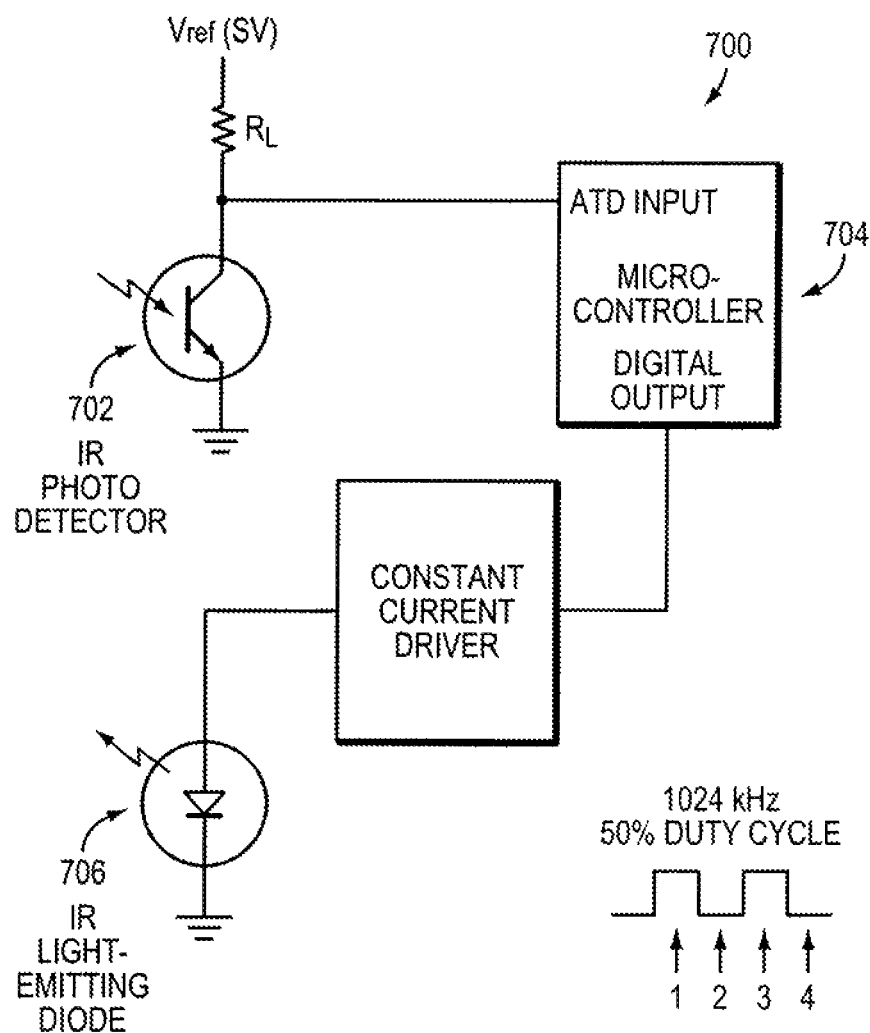
FIG. 27B is a circuit diagram for the detector circuit of another embodiment of the invention.

FIG. 27B depicts an embodiment of circuitry 700 that implements the wall-following behavior described in connection with FIG. 21B above. For this application, the four-stage circuit depicted in FIG. 27A can be replaced by a direct connection of a phototransistor light detector 702 to the analog input of the microcontroller 704. This significantly reduces the space required to implement the sensor system and reduces its cost, thus enabling more sensors to be used (for example, as additional proximity sensors around the circumference of a robot). In the depicted embodiment, an analog-to-digital conversion takes place within the microcontroller 704, and all signal processing is accomplished in the digital domain. This allows for maximum flexibility in the development of sensing algorithms.

This embodiment of the invention achieves a high response to the signal of interest, while minimizing the response to unwanted signals, by sampling the photodetector 702 at specific intervals synchronized with the modulated output of the infrared emitter 706. In this embodiment, moving-window averages of four IR-on and four IR-off samples are taken. In the figure, samples 1, 3, 5, and 7 are summed to produce an average IR-on value; samples 2, 4, 6, and 8 are summed to produce an average IR-off value. The difference between those averages represents the signal of interest. Because of the synchronous sampling, stray light, whether DC or modulated, has little effect on the measured signal.

Figure 29:
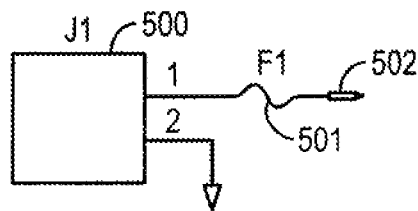
FIG. 29 is a circuit diagram for the power connection circuit of one embodiment of the invention.
Figure 30:
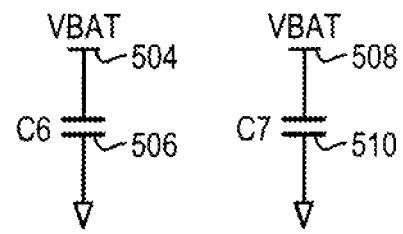
FIG. 30 is a decoupling circuit of one embodiment of the invention.
Figure 31:
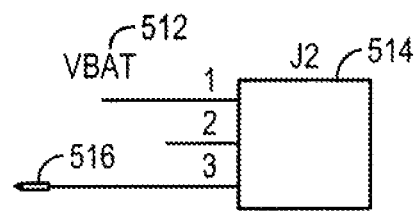
FIG. 31 is a diagram of a connector used in one embodiment of the invention.
Figure 32:
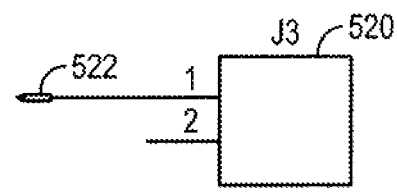
FIG. 32 is a diagram of another connector used in one embodiment of the invention.
Figure 33:
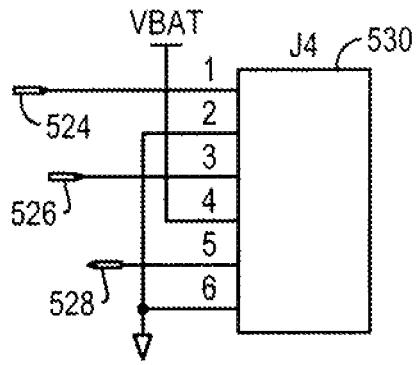
FIG. 33 is a diagram of still another connector used in one embodiment of the invention.
Figure 34:
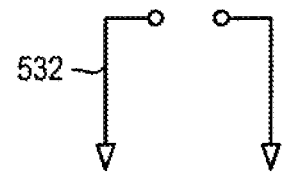
FIG. 34 is a circuit diagram of a jumper used in one embodiment of the invention.
Figure 35:
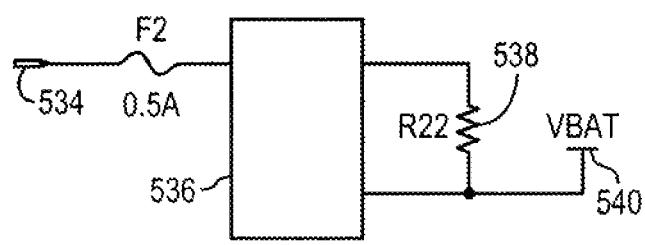
FIG. 35 is a circuit diagram for constant current source used in one embodiment of the invention.

In FIG. 29, a connector J1 (500) is used to connect the system to a means of supplying power (e.g., a battery). Fuse F1 (501) is included to limit excessive current flow in the event of a short circuit or other defect. Capacitors C6 (506) and C7 (510), FIG. 30 are provided for decoupling of other electronics (U1 and U2). Connector J2 (514), FIG. 31 provides a means of attachment for the IR LED transmitter (not shown). Connector J3 (520), FIG. 32 provides a means of attachment for the IR photo-transistor (not shown). Connector J4 (530), FIG. 33 provides a means of attachment for an indicator LED (to indicate the presence or absence of an obstacle, a means of attachment for a battery (not shown), and a means of attachment for a recharging power supply (not shown). Jumper JU2, FIG. 34, provides a convenient GROUND point for test equipment, etc. U3 (536) and R22 (538), FIG. 35 implements a constant-current source used in recharging an attached NiCad battery. U3 maintains a constant 5 volts between pins 3 and 2.5 volts divided by 22 Ohms (R22) creates a current of approximately 230 mA.

In other embodiments, a fiber optic source and detector may be used which operate similar to the sensor subsystems described above. The difference is that collimation is provided by the acceptance angle of two fiber optic cables. The fiber arrangement allows the emitter and detector to be located on a circuit board rather than mounted near the wheel of the robot. The cliff detector and wall detector can also be implemented using a laser as the source of the beam. The laser provides a very small spot size and may be useful in certain applications where the overall expense is not a priority design consideration. Infrared systems are desirable when cost is a primary design constraint. Infrared sensors can be designed to work well with all floor types. They are inexpensive and can be fitted into constrained spaces. In alternative embodiments audible or ultrasonic signals may be utilized for the emitter and/or detector.

Although specific features of the invention are shown in some drawings and not in others, this is for convenience only as each feature may be combined with any or all of the other features in accordance with the invention. The words "including," "comprising," "having," and "with" as used herein are to be interpreted broadly and comprehensively and are not limited to any physical interconnection. Moreover, any embodiments disclosed in the subject application are not to be taken as the only possible embodiments.

What is claimed is:

1. A robot comprising:
a drive system configured to maneuver the robot across a floor surface, the drive system comprising a first wheel and a second wheel;
cliff sensors housed in a forward portion of the robot, each cliff sensor aimed at the floor surface;
a vacuum inlet disposed on a bottom side of the robot;
a first side brush rotatably mounted in the forward portion of the robot, the first side brush configured to direct debris from the floor surface towards the vacuum inlet; and
a second side brush rotatably mounted in the forward portion of the robot, the second side brush configured to direct debris from the floor surface towards the vacuum inlet;
wherein the first side brush and the second side brush are each mounted at approximately equal distances from the vacuum inlet and forward of the vacuum inlet;
wherein the first wheel of the drive system is disposed aft of the first side brush on a first side of the vacuum inlet; and
wherein the second wheel of the drive system is disposed aft of the second side brush on a second side of the vacuum inlet.

2. The robot of claim 1, wherein the first side brush includes bristles extending from a hub.

3. The robot of claim 2, wherein the hub is a first hub, and the second side brush includes bristles extending from a second hub.

4. The robot of claim 3, wherein the bristles of the first side brush are configured to contact the first wheel of the drive system when the first side brush rotates and wherein the bristles of the second side brush are configured to contact the second wheel of the drive system when the second side brush rotates.

5. The robot of claim 3, wherein the bristles of the first side brush and the bristles of the second side brush are configured to extend past an outer edge of the robot.

6. The robot of claim 3, wherein the bristles of the first side brush and the bristles of the second side brush are configured to pass underneath a portion of a bump sensor on the robot.

7. The robot of claim 3, wherein the bristles of the first side brush and the bristles of the second side brush are configured to pass beneath a portion of the vacuum inlet.

8. The robot of claim 1, wherein the first side brush includes three arms spaced at approximately 120 degree angles from one another.

9. The robot of claim 8, wherein the second side brush includes three arms spaced at approximately 120 degree angles from one another.

10. The robot of claim 1, further comprising a caster wheel that is disposed between the first side brush and the second side brush and forward of the vacuum inlet.

11. The robot of claim 1, further comprising a bump sensor supported on the forward portion of the robot and responsive to a collision of the robot with an obstacle, wherein the robot is configured to maneuver via the drive system in response to detecting a bump signal from the bump sensor, and wherein the cliff sensors are disposed less than five centimeters from the bump sensor.

12. The robot of claim 11, wherein the bump sensor comprises at least two portions, wherein the robot turns at least a minimum angle in a counter-clockwise rotation in response to detecting the bump signal, and wherein a value of the minimum angle is based on which portion, of the at least two portions of the bump sensor, sends the bump signal.

13. The robot of claim 1, further comprising a main brush that is rotatably attached to the robot, the main brush configured to sweep debris from the floor surface towards the vacuum inlet.

14. The robot of claim 1, wherein the robot is circular in shape, and wherein the forward portion defines an arcuate forward edge.

15. The robot of claim 1, further comprising a debris bin disposed aft of the vacuum inlet and the drive system.

16. The robot of claim 1, wherein one or more of the cliff sensors comprise an infrared emitter and an infrared detector, and wherein the infrared emitter and the infrared detector are angled relative to the floor surface.

17. The robot of claim 16, wherein the infrared emitter is configured to modulate an infrared signal.

18. The robot of claim 1, further comprising a wall sensor, wherein the robot is configured to turn away from a wall in response to detecting the wall with the wall sensor, and wherein the robot is further configured to turn back toward the wall about a turn radius in response to the wall sensor no longer detecting the wall.

19. The robot of claim 18, wherein the robot is configured to decrease a value of the turn radius while turning back toward the wall, the value of the turn radius being decreased relative to an initial value of the turn radius.

20. The robot of claim 18, wherein the robot is configured to determine that the wall includes a corner based on a signal from the wall sensor, and wherein the robot is configured to navigate around the corner in response to the detecting.

* * * * *